(12) United States Patent
Murphy et al.

(10) Patent No.: US 8,782,409 B2
(45) Date of Patent: Jul. 15, 2014

(54) CONFIDENTIAL MESSAGE EXCHANGE USING BENIGN, CONTEXT-AWARE COVER MESSAGE GENERATION

(75) Inventors: Shaun Murphy, Orlando, FL (US);
Charles Murphy, Sarasota, FL (US);
Richard Johnson, Briarcliff Manor, NY (US)

(73) Assignee: Private Giant, Tarrytown, NY (US)

( * ) Notice: Subject to any disclaimer, the term of this patent is extended or adjusted under 35 U.S.C. 154(b) by 0 days.

(21) Appl. No.: 13/488,391

(22) Filed: Jun. 4, 2012

(65) Prior Publication Data

US 2013/0326221 A1 Dec. 5, 2013

Related U.S. Application Data

(60) Provisional application No. 61/655,434, filed on Jun. 4, 2012.

(51) Int. Cl.
*H04L 9/32* (2006.01)

(52) U.S. Cl.
USPC .......................................... 713/168; 713/153

(58) Field of Classification Search
USPC ................... 713/150–153, 162, 168
See application file for complete search history.

(56) References Cited

U.S. PATENT DOCUMENTS

| 7,152,159 | B2 | 12/2006 | Toyota et al. | |
|---|---|---|---|---|
| 7,325,127 | B2 | 1/2008 | Olkin et al. | |
| 8,266,421 | B2 | 9/2012 | Sidman | |
| 8,463,234 | B2 | 6/2013 | Lee et al. | |
| 2002/0101998 | A1 | 8/2002 | Wong et al. | |
| 2003/0046533 | A1* | 3/2003 | Olkin et al. | 713/152 |
| 2005/0138110 | A1 | 6/2005 | Redlich et al. | |
| 2010/0125734 | A1 | 5/2010 | Cho | |
| 2011/0083010 | A1* | 4/2011 | Cohen et al. | 713/153 |
| 2011/0208960 | A1* | 8/2011 | Flood | 713/153 |
| 2011/0296179 | A1 | 12/2011 | Templin et al. | |
| 2012/0023212 | A1* | 1/2012 | Roth et al. | 709/223 |
| 2012/0023571 | A1* | 1/2012 | Spies et al. | 726/12 |

OTHER PUBLICATIONS

Boneh et al, "Chosen Ciphertext Secure Public Key Threshold Encryption Without Random Oracles", Cryptology-CT-RSA 2006 (2006, Springer).

Kannamanani, R. "Software to provide security for Web Browser Cookies and Passwords using Trusted Computing Technology", Department of Computer Science, Fraunhofer Institute for Security IT, Master's Thesis, Summer 2008.

(Continued)

*Primary Examiner* — Farid Homayounmehr
*Assistant Examiner* — Suman Debnath
(74) *Attorney, Agent, or Firm* — Shun Yao; Park, Vaughan, Fleming & Dowler LLP

(57) ABSTRACT

Systems and methods are disclosed permitting a sender to send a secret and secure message to a recipient. An application on a sender device interfaces with known message generating tools to permit a user to generate a message. The local application encrypts the message (and optional attachments) based on public/private key pairing negotiated with the server given the recipient device id. The sender device transmits the cipher text to the server. The server generates a benign, text-based, context-appropriate message and delivers same to a recipient device by way of a known messaging service. The benign message provides a secret clue to the recipient that an encrypted message is available. Recipient may then access and decrypt the encrypted message, such as from the server in response to a successful challenge (e.g., password request).

23 Claims, 19 Drawing Sheets

(56) References Cited

OTHER PUBLICATIONS

Kohl, John T. et al., "The Evolution of the Kerberos Authentication Service", revision of paper presented at the Spring 1991 EurOpen Conference, Tromso, Norway, 1991.
Kretch, "A quick guide to getting started with PGP on Athena", www.mit.edu/afs/sipb/project/doc/pgp/pgp.html, Mar. 22, 2012.
Penango web page providing details of commercial product, www.penango.com, Mar. 22, 2012.
Callas, J. et al., "OpenPGP Message Format", RFC 4880, tools.ietf.org/html/rfc4880, IETF, Nov. 2007.
Ramsdell, B. et al., "Secure/Multipurpose Internet Mail Extensions (S/MIME) Version 3.2 Message Specification", RFC 5751, IETF, tools.ietf.org/html/rfc5751, Jan. 2010.
TigerText for Mobile Security, commercial website, www.tigertext.com, Mar. 22, 2012.
Feisthammel, P., "PGP: Explanation of the web of trust of PGP", www.rubin.ch/pgp/weboftrust.en.html, Hauptseite Server-Hauptseite PGP-Key Signing Sessions, Feb. 2006.

\* cited by examiner

CONFIDENTIAL MESSAGE EXCHANGE USING BENIGN, CONTEXT-AWARE COVER MESSAGE GENERATION

CROSS-REFERENCE TO RELATED APPLICATIONS

The present disclosure is related to and claims priority from copending Provisional U.S. Patent Application Ser. No. 61/655,434, filed on Jun. 4, 2012, which is incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

The present disclosure is related to secure electronic communication between two or more stations, and more specifically to a method and system for transmitting/receiving a secure communication together with a generated benign, context-aware cover message.

Electronic mail (email), short message service (SMS, or text), micro-web blogging (e.g., tweets) and so forth (collectively, "electronic communication") are now common and perhaps indispensable methods of communication. These tools are used for both personal communication and business communication. It is commonly believed that the content of such communications are relatively secure and private. However, in many circumstances, an expectation of security and privacy is not well founded. Common channels for such communications are relatively easy to intercept. Service providers often provide archiving of messages that may be accessed, easily or with varying degrees of effort and authority. Communications are often retained, at least temporarily, on a user's hardware device, such as a cellular telephone, laptop computer, tablet computer, and so on. Therefore, a misplaced (or stolen) device may give others access to communications retained thereon.

Many techniques exist for improving the level of security and privacy in electronic communication. One basic method is to provide control over the access to email accounts, text accounts, and so on, such as through use of passwords. That is, a password is required to enter an account, and once within the account sending and receiving communications are enabled. However, password-protected accounts provide only a superficial level of security for electronic communications via such accounts. Passwords are generally fairly easy to break. They may be lost or forgotten, and so are often written down, leading to their discovery. The communications are readily accessible and archived at the service provided level (i.e., behind the user-level password protection). A computer or cell phone may be left with the mail or text application open and running, permitting access to communications. Communications may be intercepted in transit, thereby obviating the need to access the sending or receiving account. And in extreme cases, a user may be forced to provide a password under duress.

In another approach, the sender encrypts a message using a key. The receiver has a corresponding key, which is used to decrypt the message when received. There are many variations of this encryption-decryption scheme, such as private keys, public key exchange, and so on. Problems with the encryption-decryption approach include the need for processing resources to perform the encryption-decryption on the sending and receiving devices, and the risk of loss of security of the key or the device that performs the encryption-decryption. Furthermore, encryption usually converts a human-readable message into a jumble of numbers and letters that is not readable other than after decoding. However, the jumble of letters and numbers then appears to be just what it is—an encrypted message. An unauthorized user can therefore quickly identify the message as being encrypted, and hence a target for efforts at decryption, coerced or otherwise.

Another technique for lending security to electronic communication is to permit communication only between pre-authorized devices. In certain versions of such schemes, a message contains code that prevents it from being delivered to, opened by or read on a machine other than one identified in that code. In other versions, limiting access to a network carrying the electronic communications only to approved devices ensures security. There are many other access-limiting schemes for enabling secure communication. However, problems with these approaches in general include the potential inability or difficulty to include new users in a communication, the need to expose a user's device id when sending or receiving a message, and since the message may in fact be encoded until the authenticity of the receiving device is confirmed, the presence of an encoded message may be apparent (again, identifying it as a target for decryption efforts).

Legal efforts to provide at least a sense of security in electronic communication also exist. For example, it is a violation of federal law to intercept an email message without proper authority. It is also a violation of federal law for a third party to access the content of another's email communication during the process of storing or transmitting the communication. Many other laws seek to discourage and redress improper accessing of another's electronic communication. However, there are many who will not be dissuaded by such laws. Often, by the time the law is enforced, the damage from publication of the secret message is done. And, with proper legal authority, such as with subpoena or other form of approval, certain agencies may nonetheless intercept and access electronic communication.

SUMMARY

Accordingly, the present disclosure is directed to systems and methods for providing secure electronic communications from one party to another that is both secure, in the sense of encryption, and secret, in the sense that third parties may not be aware that a secure message has even been received. The aforementioned problems associated with purely encrypted messages, limiting system access, legal controls, and so on are addressed. Secure and convenient electronic messaging systems and methods are enabled.

According to one aspect of the disclosure, a system comprises a sender device such as a computer, smart phone, tablet, and so on, a central server, and a recipient device. A local application runs on the sender device that interfaces with known message generating tools such as an SMS texting application, a word processing application, an email application, a micro-blog application, and so on to permit a user to generate a message to be securely transmitted. The local application encrypts the message (and optional attachment), generating cipher text, based on public/private key pairing negotiated with the server given the recipient device id. The sender device transmits the cipher text to the server. The server generates a benign, text-based, context-appropriate message. The benign message (as used herein) is specifically associated with the encrypted message. The benign message may be read at the recipient device. The benign message provides a subtle, secret clue to the recipient that an encrypted message is available. One of a variety of methods may be used for the recipient to access the encrypted message, such as initiating a local application that retrieves the message and, in response to a successful challenge (e.g., password request), permits access to the encrypted message.

According to another aspect of the disclosure, the system also permits a user to encrypt supplemental documents for attachment to or for transmitting with an encrypted message. Examples of such supplemental documents include a video file, an audio file, a word processing document, a spreadsheet, computer-readable code for implementing an application, and so on. The supplemental documents may be attached to the encrypted message, may be sent as a separate payload, or may be retained on the server so that the user can retrieve them (if authenticated) when convenient.

According to another aspect of the disclosure, the sender may indicate a lifespan for the message. The lifespan may be measured in a variety of ways, such as elapsed time, an absolute date, a number of views, a number of attempted decryptions (successful or unsuccessful), etc. After passing of the lifespan, the message may be deleted from the server or from the recipient machine (through code it carries), may be hashed so as to be unreadable, decryption keys may be irreversibly destroyed, and so on.

According to yet another aspect of the present disclosure, each user has at least two keys created as part of the account creation: The primary key pair, for passing a secret message and exchanging with trusted contacts; and a compelled-to-produce ("safe") key pair, used when someone forces a user to give up a password. If a user is forced to give up a key, the user can provide the safe key that will provide access only to an otherwise benign or false message or set of messages. In the case of the safe key, only the central-server has access to this public key. In addition to the primary key pair, a plurality of key pairs may be generated for a variety of services (i.e. business email, personal email, microblogging) or for specific parties.

According to still another aspect of the present disclosure, one or more of a variety of seeds may be used to generate the benign message. For example, the city in which the recipient resides may be used to offer a message about current weather, such as "Sorry to hear about the cold weather in New York this week", about sports, such as "Tough loss for the Rangers last night", about local news, such as "Let me know if I can help with a contribution to the school that was vandalized" and so on. The seed may be one or more of the following: a physical location of the recipient; a recent communication from or to the recipient; or data from a personal profile of the recipient, such as personal interests, travel, family status, and so on. The server may also pull data for content of the benign message from many other geographically and/or temporally disparate sources, prior similar messages, and other sources so as to provide what otherwise appears as a contextually appropriate but benign natural language message. Multiple language support may also be provided. (Any personal information obtained and used in such a system may be subject to appropriate and prudent permissions and security.) The benign message may also be password protected, such as using the safe key, for an appearance of security, to be consistent with the system in which the messaging takes place, and so on.

Accordingly, systems and corresponding methods are disclosed according to which certain embodiments comprise: a message device comprising a recipient address key table and a recipient address context data table; a sending device communicatively coupled to said message device, said sending device comprising: (a) a message application configured to: (i) enable selection of a message; (ii) enable specifying a recipient address for said message; and (iii) retrieve from said recipient address key table an encryption key corresponding to said recipient address; (b) an encryption engine configured to encrypt said message using said encryption key associated with said recipient address; and (c) an interface to deliver said encrypted message associated with said recipient address to said message device; said message device configured to: (a) use said recipient address specified by said messaging application and context data from said recipient address context data table associated with said recipient address to generate a benign, contextually appropriate message; (b) post said encrypted message to a messaging portion of said message device; and (c) initiate delivery of said benign, contextually appropriate message to said recipient address as an indicator of the availability of said encrypted message. Other embodiments and variations thereof are also disclosed herein.

The above is a summary of a number of the unique aspects, features, and advantages of the present disclosure. However, this summary is not exhaustive. Thus, these and other aspects, features, and advantages of the present disclosure will become more apparent from the following detailed description and the appended drawings, when considered in light of the claims provided herein.

BRIEF DESCRIPTION OF THE DRAWINGS

In the drawings appended hereto like reference numerals denote like elements between the various drawings. While illustrative, the drawings are not drawn to scale. In the drawings.

DETAILED DESCRIPTION

We initially point out that description of well-known processes, components, equipment and the like may merely be summarized or are omitted so as not to unnecessarily obscure the details of the present disclosure. Thus, where details are otherwise well known, we leave it to the application of the present disclosure to suggest or dictate choices relating to those details.

Figure 1:
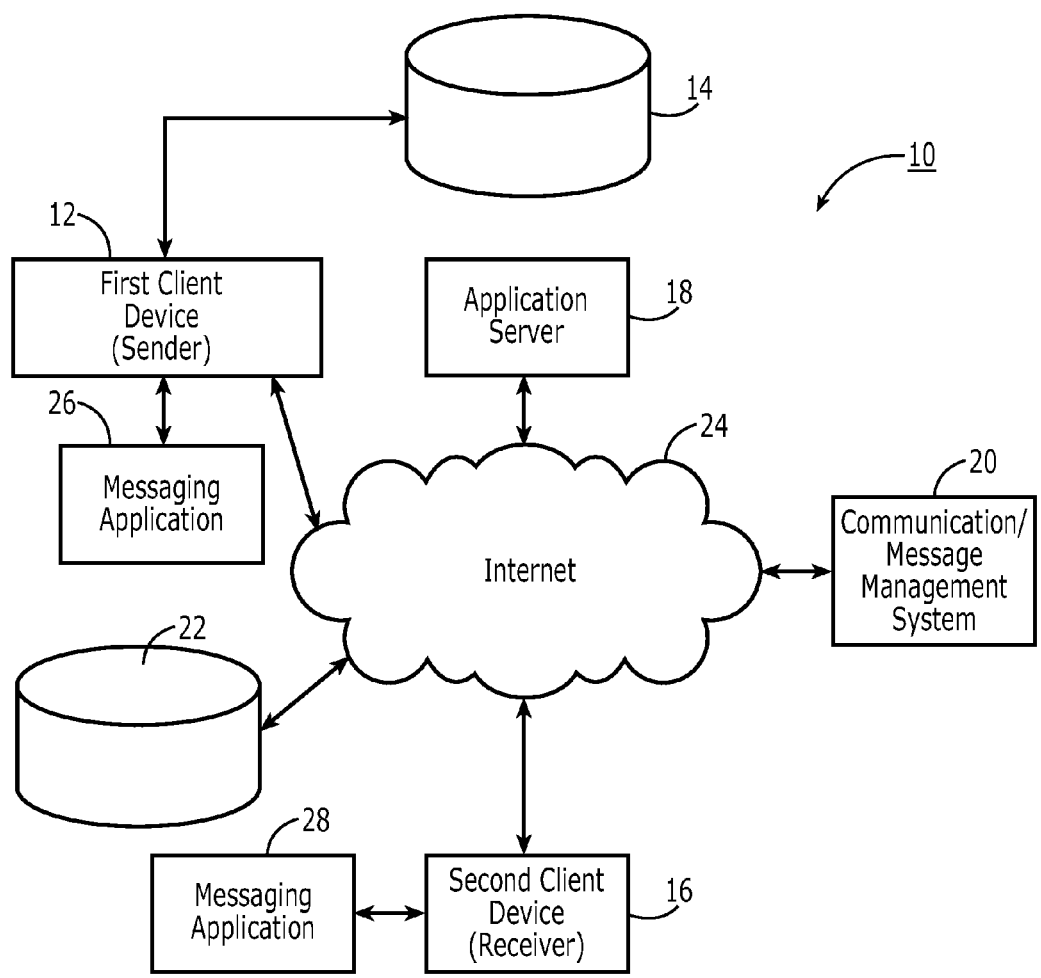
FIG. 1 is a schematic representation of a communications network within which various embodiments of the present disclosure may operate.

With reference initially to FIG. 1, a distributed network environment 10 is shown, comprising hardware and associated software, within which various embodiments of the present disclosure may be employed. More specifically, distributed network environment 10 comprises multiple interconnected elements of hardware, each running software, allowing those elements of hardware to communicate with one another, whether by wired or wireless connection. Such elements of hardware include, but are not limited to, a first communication device 12 (also referred to herein as "sender"), that may have associated memory 14, second communication device 16 (also referred to herein as "receiver"), an applications server 18 (also referred to herein as "secret and secure messaging application server" or simply "message server"), a communications and message management system 20, and network appliances 22 such as remote storage, each communicating via the public Internet 24. Alternatives to using the public Internet, or additional interconnection mechanisms include local area networks (LANs), wide area networks (WANs), etc. Alternatives to client devices, or additional computer mechanisms include workstations, personal computers, servers that are personal computers, mini- or tablet-computers, computers, computationally enabled personal digital assistants (PDAs), computationally enabled cell phones ("smart phones"), mainframes, etc. The network within which the various embodiments of the present disclosure operates may also comprise additional or fewer devices without affecting the scope of the present disclosure.

While described in terms of a client-server model herein, the embodiments of the present disclosure may also operate in peer-to-peer or device-to-device models, cloud computing models, and so forth. Thus, while reference is made to separate communications devices and a secret and secure messaging application server, a sending communications device may include the functionality of the secret and secure messaging application server. A message device and a sending device (or alternatively, receiving device), may be portions of a single physical device, such as where such a single physical device includes memory, a processor, communication ports, and applications capable of providing both such functionalities. Still further, such a single device may be connected to other devices to provide a portion of the functionalities of the sending communications device and the secret and secure messaging application server. Accordingly, it will be appreciated that a client-server model is just one example of an implementation of the broader concepts provided by the present disclosure, and unless otherwise stated the claims hereof shall not be interpreted as being so limited.

First and second communication devices 12, 16 may be desktop or workstation devices, mobile devices (such as portable computers, so-called "smart phones", tablet computers, and the like) or a mix of different types of devices. First and second communication devices 12, 16 may communicate via the public Internet 24 using known Web browser software or dedicated, specific-purpose application software. As is well known, software components supporting client devices 12, 16, server 18, system 20, and network appliances 22 include or reference logic and/or data that may form a part of the software component or be embodied in or retrievable from some other hardware of software device or signal, either local or remote and coupled via a network or other data communications device. For example, first communication device 12 may have associated with or stored thereon a copy 26 of a messaging application software program that operates in conjunction with elements of first communication device 12 and other elements of distributed network environment 10 to provide certain functionality described in further detail below. Similarly, second communication device 16 may also have associated with or stored thereon a copy 28 of the messaging application software program that operates in conjunction with elements of second communication device 16 and other elements of distributed network environment 10 to provide certain functionality described herein.

Thus, embodiments of the invention may be implemented as methods, apparatus, or articles of manufacture as or in software, firmware, hardware, or any combination thereof. As used herein, article of manufacture (or alternatively, computer program product) is intended to encompass logic and/or data accessible from any computer-readable device, carrier, or media.

Those skilled in the art will recognize many modifications may be made to this exemplary environment without departing from the scope of the present disclosure. For example, it will be appreciated that aspects of the present disclosure are not dependent upon data structure formats, communications protocols, file types, operating systems, database management system, or peripheral device specifics. Accordingly, the following description is provided without reference to specific operating systems, protocols, or formats, with the understanding that one skilled in the art will readily be able to apply this disclosure to a system and format of choice.

The present disclosure provides computer-implemented systems and methods enabling secure communication between sender and receiver within an otherwise insecure communication system, in a manner that such the secure communication is not immediately apparent from an examination of the sender or, in particular, the receiver devices. As used herein, a "communication" is intended to be understood in its broadest sense, and may include any form of electronically delivered information, whether from sender to receiver only, from sender to multiple receivers, part of a two- or more-way exchange of electronically delivered content, or some other structure. As used herein, "information" is intended to be understood in its broadest sense, and is independent of the format of that information such that it may include text, audio, still or motion video, combinations of these formats, and so on. For simplicity of explanation, information in text form will be used in the typical example herein, with the understanding that the present disclosure is not limited to information in text form.

Furthermore, to avoid ambiguity, "text" as used herein refers to the representation of written language. This is to be distinguished from "texting." Information in text form may be transmitted by many different channels. "Texting" as commonly used is the exchange of information via the SMS protocol. Therefore, "text" may be exchanged by "texting". It may also be exchanged by email, micro-blogging ("tweeting"), and so on.

Therefore, unless specified in the claims hereof, the form of information exchanged does not form a limitation on the scope of the present disclosure. Similarly, unless specified in the claims hereof, the channel or protocol used to exchange that information does not form a limitation on the scope of the present disclosure.

Figure 2:
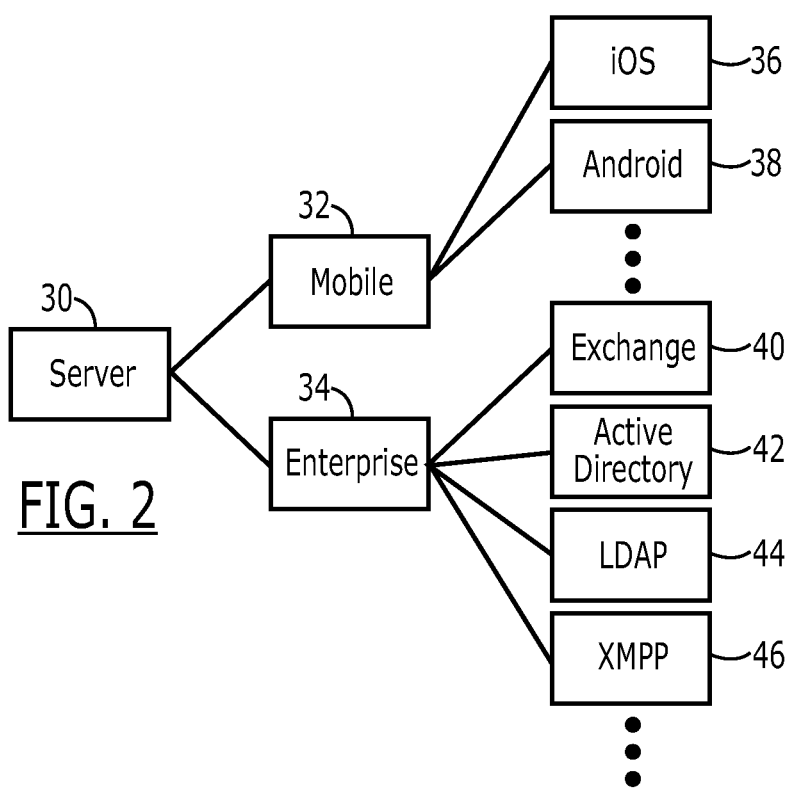
FIG. 2 is an illustration of software connectivity permitting secret and secure communication according to an embodiment of the present disclosure.

With reference next to FIG. 2, a model of various software components forming a part of an embodiment of the present disclosure is illustrated. These software components may be stored on and accessed and operated by one or more hardware components. This model comprises server software 30, a mobile software suite 32, and an enterprise software suite 34. Mobile suite 32 may operate with one or more mobile device operating systems, such as iOS 36, Android OS 38, and so on. Among other functions, mobile software suite 32 may provide interoperability of software server 30 with the aforementioned one or more mobile device operation systems. Enterprise software suite 34 may operate with one or more enterprise systems and protocols, such as Microsoft Exchange 40, Microsoft Active Directory 42, Lightweight Directory Access Protocol (LDAP) 44, Extensible Messaging and Presence Protocol (XMPP) 46, and so on. Among other functions, enterprise software suite 34 may provide integration of server software 30 with the aforementioned one or more enterprise systems and protocols.

Figure 3:
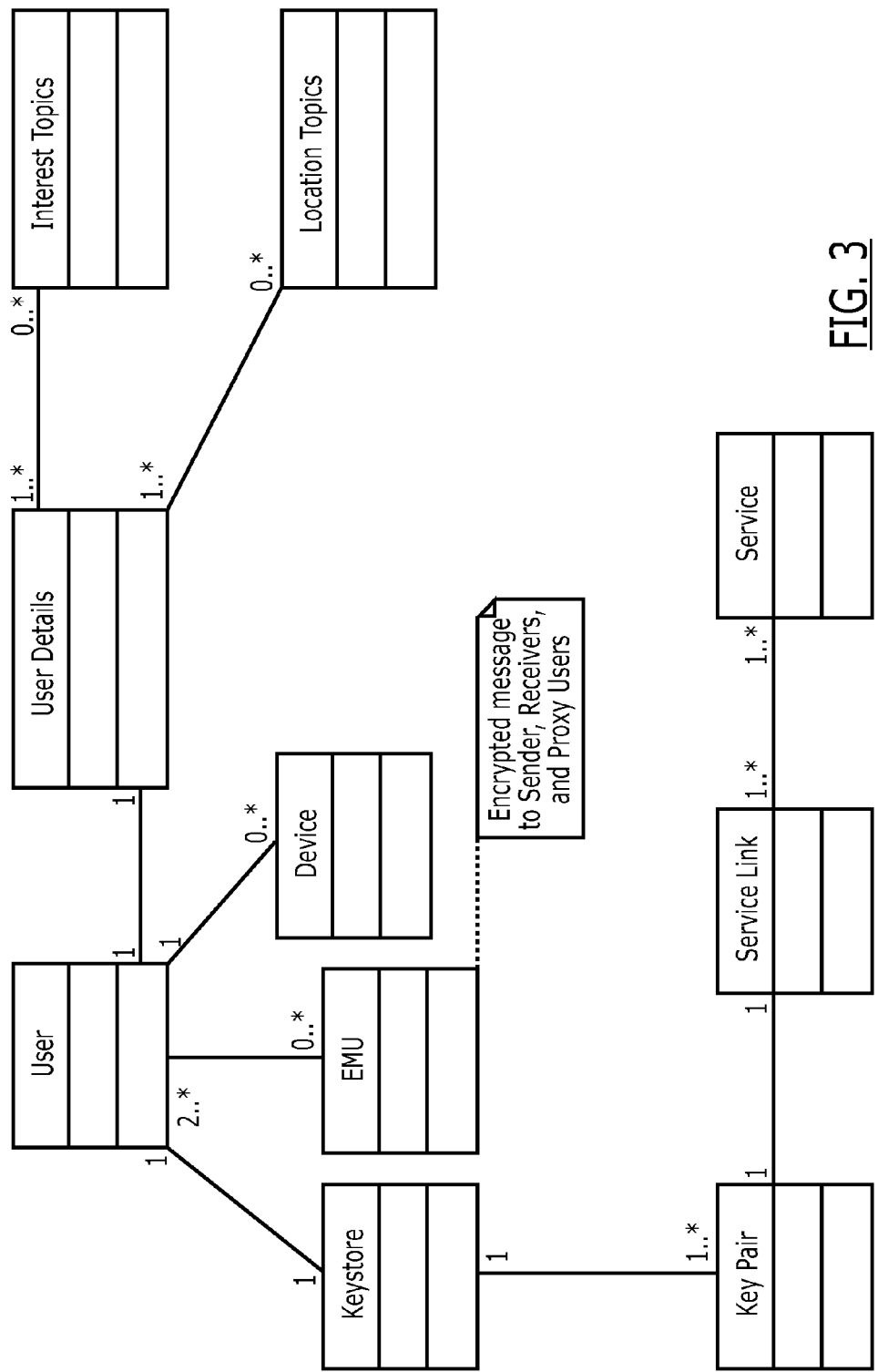
FIG. 3 is database schema illustration showing the values of various fields in a database to support secret and secure communication according to an embodiment of the present disclosure.

According to one embodiment of the present disclosure, a data model is assembled from a document-oriented database that contains information about a user, the user's public key(s), the user's authorized device(s), and the user's communications service(s) (such as email address, SMS number, etc.) FIG. 3 is an example of a database schema illustrating various entry relationships. The user's messages (electronic message unit or "EMU") and documents may include several types of data, including textual information, images, videos, documents, and audio.

The communication between clients and the message server(s) may, in one embodiment, employ traditional secure socket layer (ssl) http requests following the RESTful design pattern of web-based Create, Read, Update, and Delete. The application programming interface (API) features the following method areas.

---

User Management
  /api/{version}/user
    1. Create User
    2. Validate User
    3. Reset Password
    4. Login Token (amazon encrypted authentication)
    5. Change Password
    6. Purge Account (recoverable)
    7. Revoke Device
    8. Add Device
    9. Purge Keys (recoverable)
    10. Change User Details
    11. Create Service Link (email, facebook, etc.)
Message Management
  /api/{version}/message
    1. Send Message
      a. To New User
      b. To Existing User
    2. Revoke Message
      a. From All (sender and recipients)
      b. From Specific Recipients
    3. Retrieve Message
      a. As New User
      b. As Existing User
    4. Delete Message
    5. Forward Message (given permission, change recipients/service)

---

Figure 4:
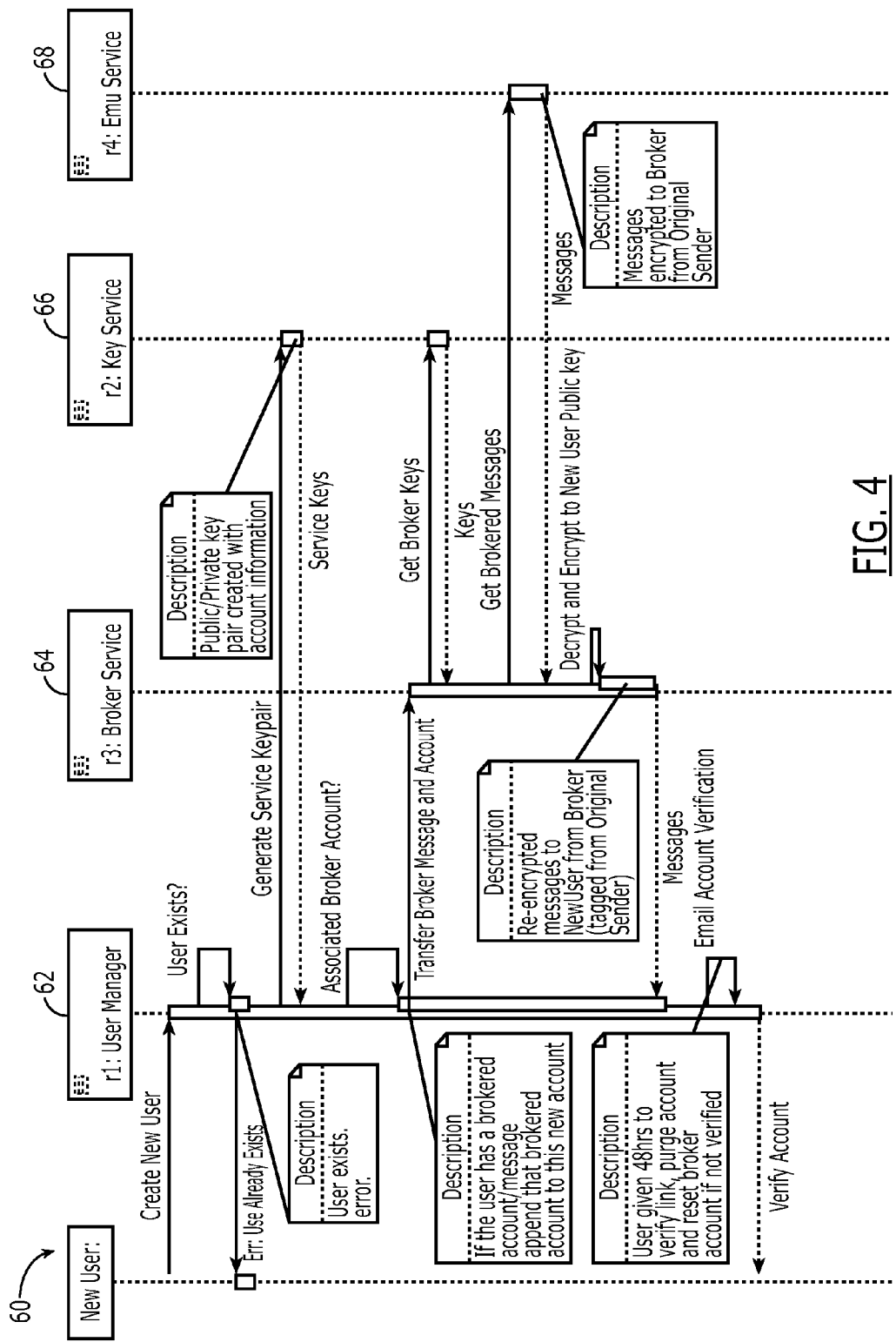
FIG. 4 is a communications flow diagram illustrating an example of a new user account creation process to support secret and secure communication according to an embodiment of the present disclosure.

According to an embodiment of the present disclosure, use of a system described above may proceed as follows. Initially, a new user creates an account with the message server. With reference to FIG. 4, an example of a new user account creation process 60 is shown. The user account requires an email address and may optionally take a cell phone number for SMS verification. New user account process 60 performs at least four general services. First, the new account processes new user interactions at 62. If the user was "invited" into the system (e.g., either by an acquaintance recommendation or by way of a sender attempting to send the user an EMU), the user will have a broker account already established. The broker account is a temporary and surrogate public/private key pair that has a limited lifespan (expiration date, number of uses, etc.) that will be transferred once a user account claims it and is verified. New user account process 60 therefore also performs broker account services 64. A result of a successful new user registration is the assignment of public/private keys to the new user. The key services portion 66 of new user account process 60 handles these key assignments. Finally, and particularly in the case of a broker account, a sender may provide a new user with an encrypted message. New user account process 60 therefore also performs EMU (message provision) services 68.

Each user has at least two public keys created as part of the account creation. A Service Key is the primary key for encrypting a message to be provided to a recipient, using the same service (i.e. email, microblogging,) as a secret and secure message. When the encrypted message is successfully retrieved by the recipient, the recipient device uses the Service Key in the decryption process. A Safe Key is a secondary key used in situations when a user is unwilling compelled to produce a key. The Safe Key provides access to messages, such as benign messages, to satisfy a third party that the user isn't hiding additional messages. Passwords are also associated with the keys, either a unique password for each key or a similar password for both. A password/key input process cycles through each cipher text entry provided by the message server to the device for the message, and based on the success of the encryption one of three states are provided: the secret message is successfully decrypted on the device; the secret message is not successfully decrypted, but an appropriate (one-to-many) benign message is decrypted on the device and no reference is made to the secret message; or decryption fails.

Figure 5:
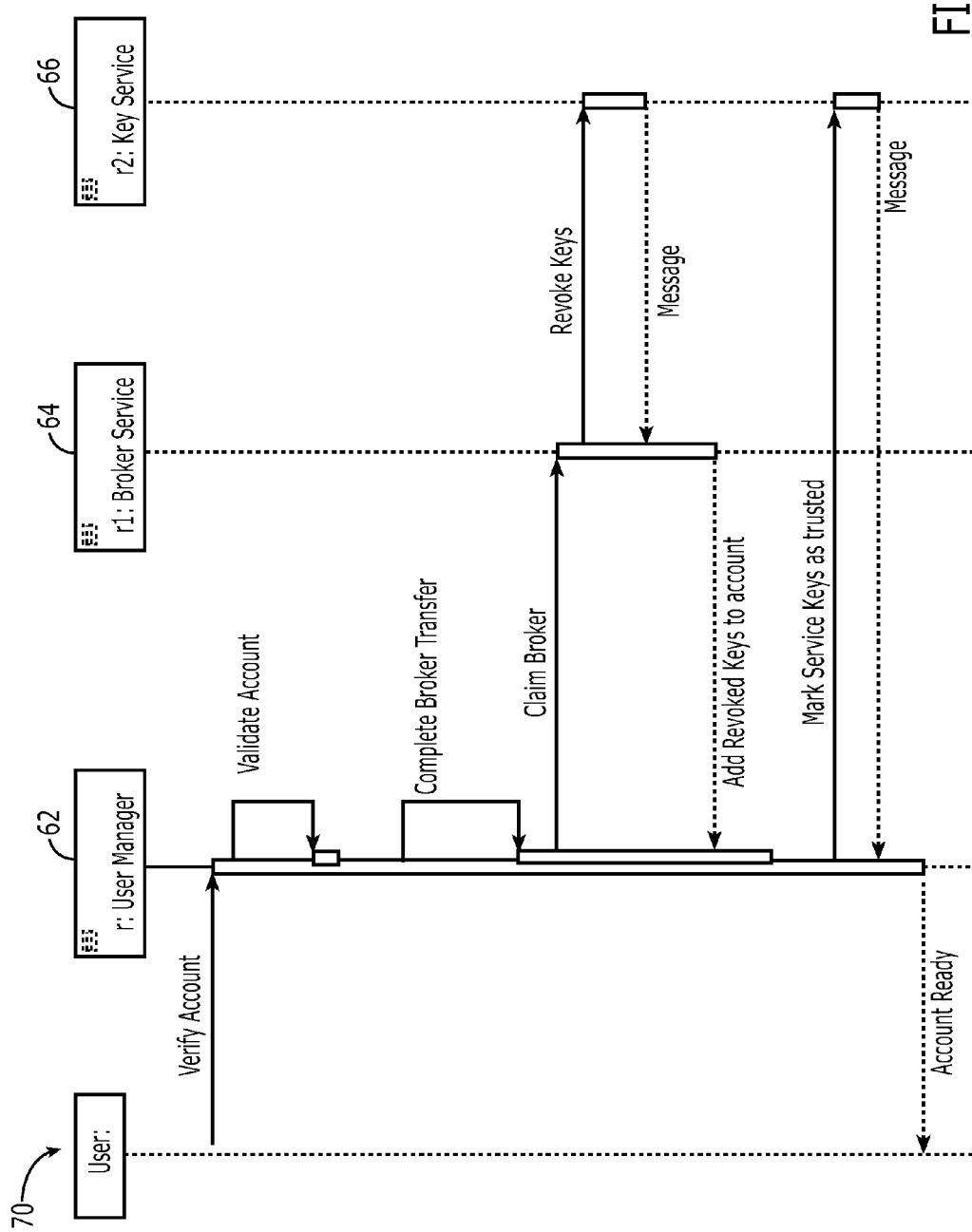
FIG. 5 is a communications flow diagram illustrating an example of a new user account verification process to support secret and secure communication according to an embodiment of the present disclosure.

With reference to FIG. 5, once a user account is created, it is verified by process 70. Verification may be accomplished by service-level verification (e.g., email, SMS, etc.) where the new user is contacted, by the system, with a unique verification code/URL that must be processed according to the verification message. Once a user account is verified, any claimed broker account will be transferred to the verified user account.

Figure 6:
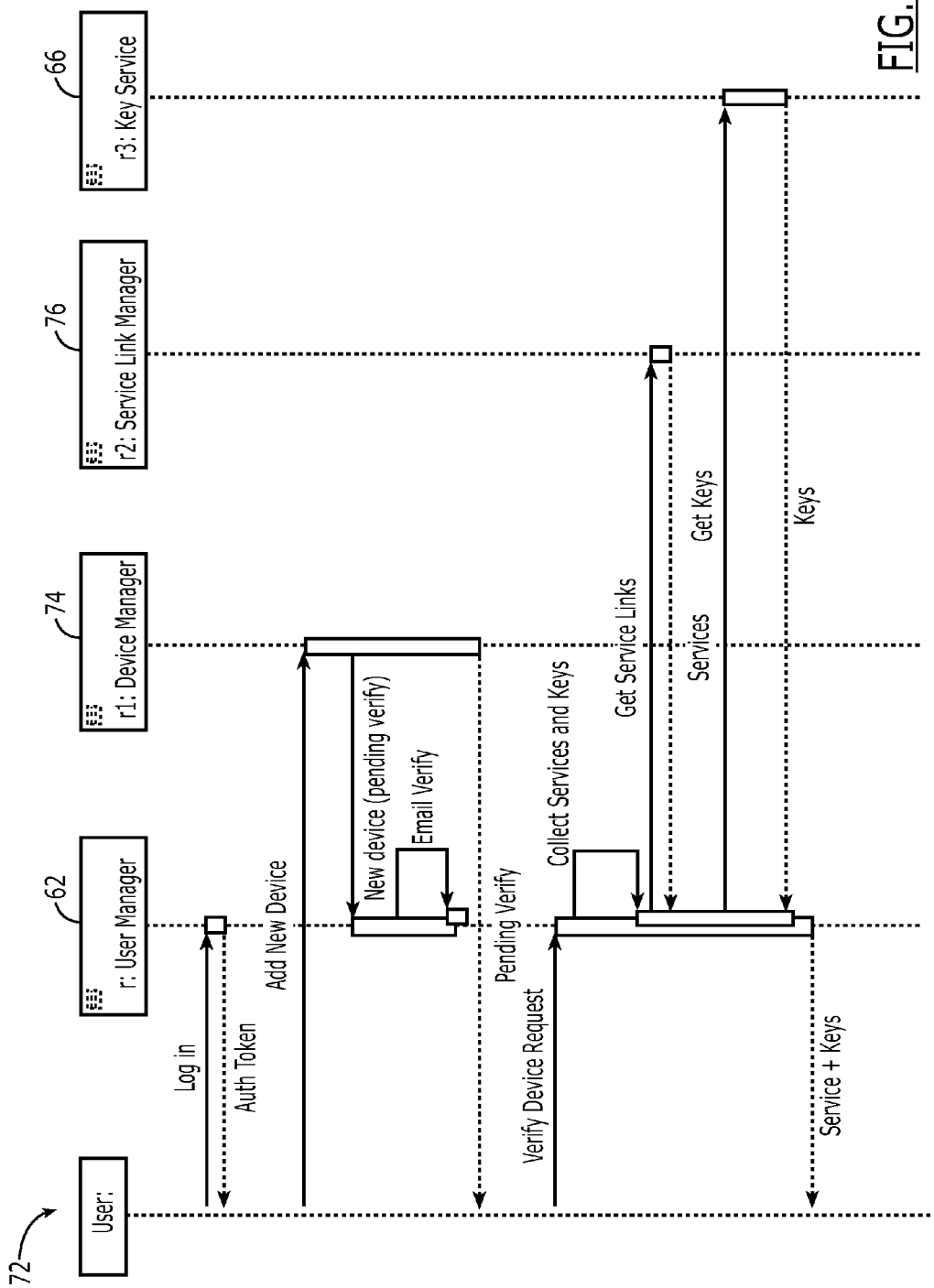
FIG. 6 is a communications flow diagram illustrating an example of associating a user account with one or more communications services to support secret and secure communication according to an embodiment of the present disclosure.

With reference to FIG. 6, process 72 associates devices (such as cell phones, web browsers, tablets, etc.) to user account. This association restricts access for private key transmission, authorization, and location-based benign message generation (discussed further below). Device manager service 74 manages the association of devices with user accounts, and service link manager service 76 manages services with which a user device is associated (for example, accounts with Facebook, Twitter, LinkedIn, Google+, and so on).

Figure 7:
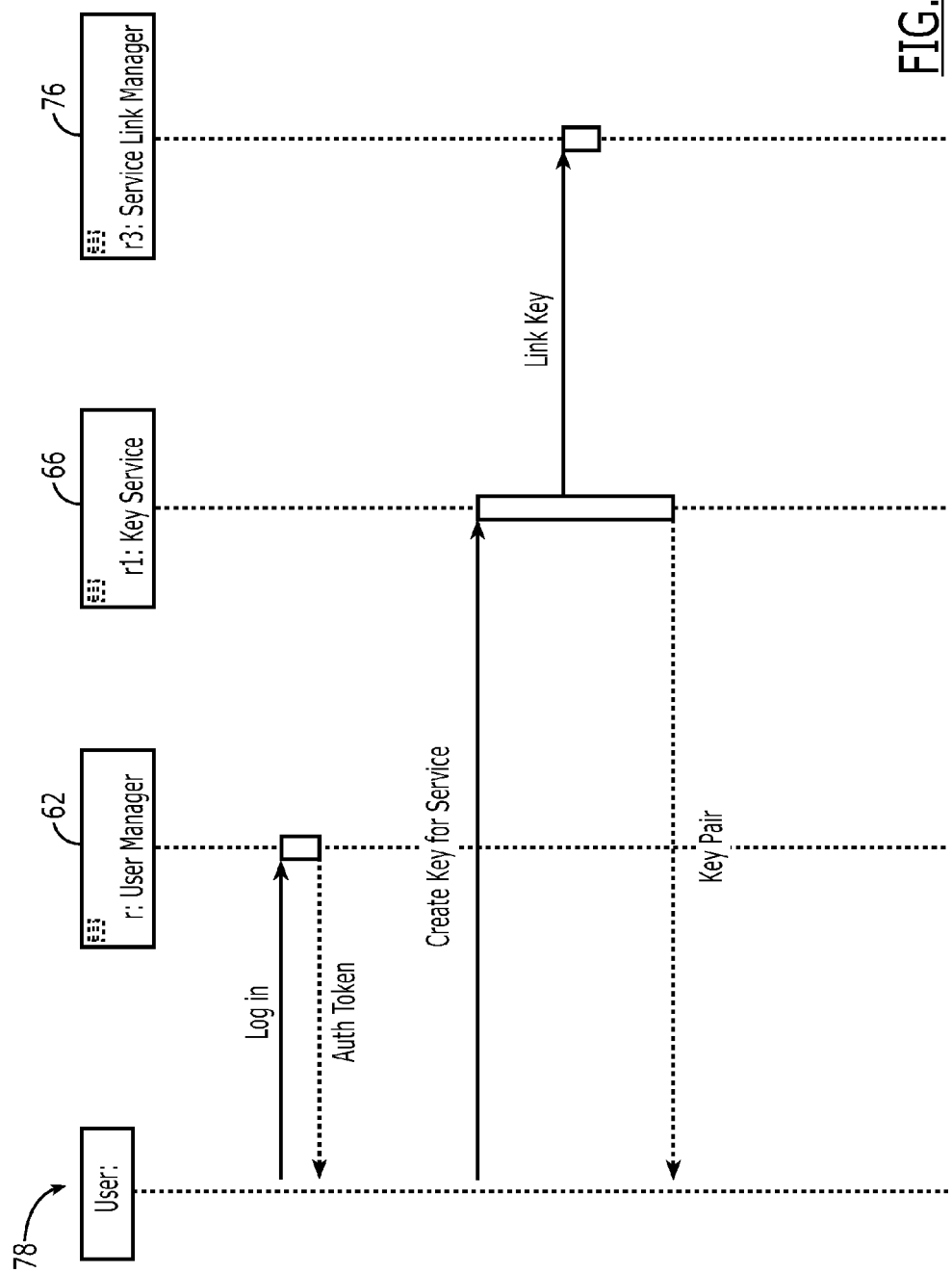
FIG. 7 is a communications flow diagram illustrating an example of a process for generating a new public and private key for a user to support secret and secure communication according to an embodiment of the present disclosure.

In addition to generation of new keys for new users, there are situations in which a new public and private key are to be generated for an existing user. This could be employed, for example, when a user desires to revoke a previous key and create a new one. This process may irreversibly purge old messages, since in the absence of the original key, no access will be granted to messages associated with that key. An exemplary process 78 for generating a new public and private key is illustrated in FIG. 7.

Figure 8:
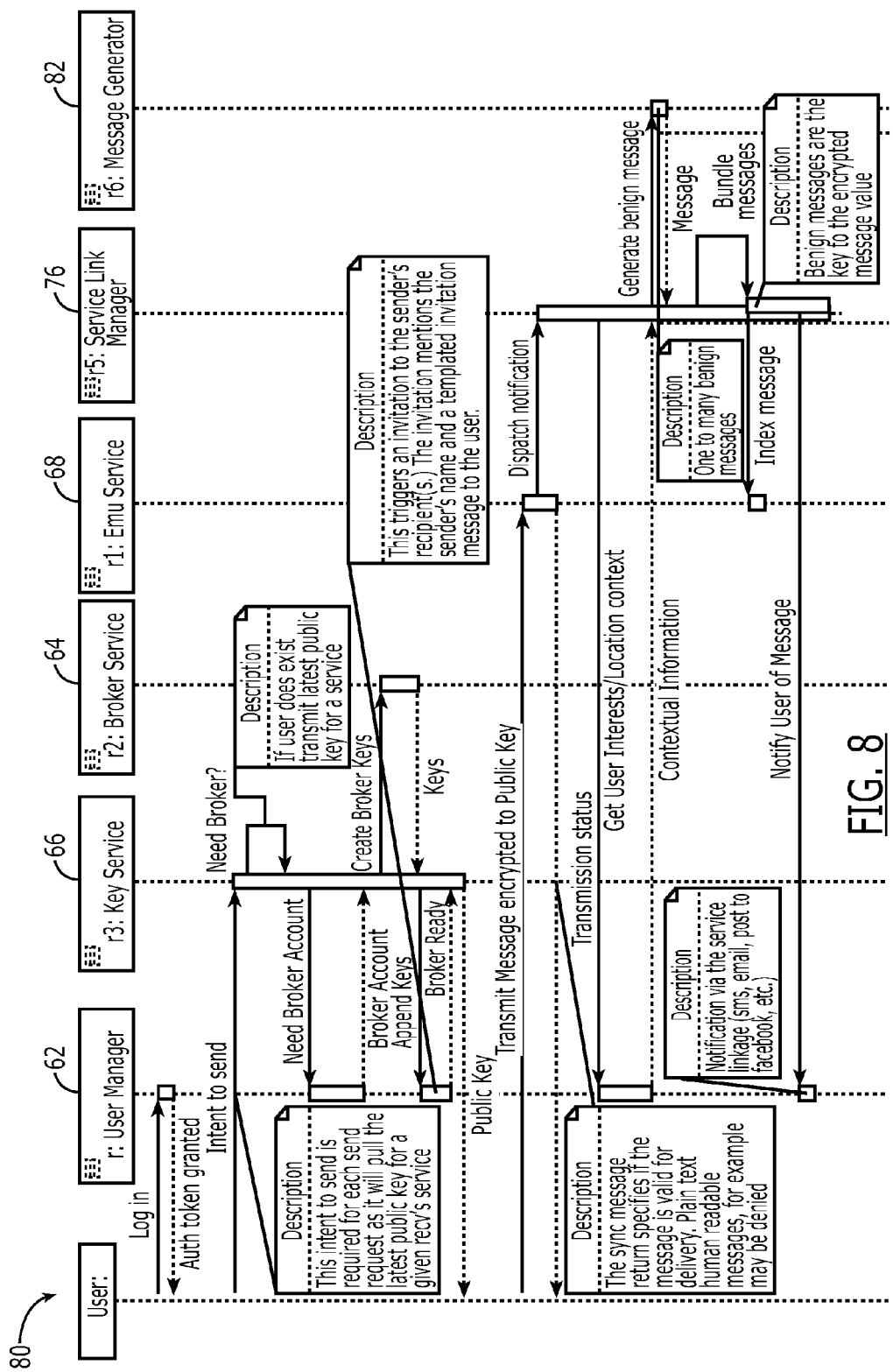
FIG. 8 is a communications flow diagram illustrating an example of a process for generating and sending a secure and secret message according to an embodiment of the present disclosure.

Once a user is registered with the system, the user (sender) may create and send a secure and secret message to another user. With reference to FIG. 8, a process 80 for generating and sending a secure and secret message is shown. A local application is running on the sender's device at this point. The sender may compose a message using the local application or a supplemental application (e.g., a word processing application, SMS messaging application, and so on) on the sender's device (e.g., personal computer). Media from other applications may also be attached to the message, as discussed further below. To send the message and/or attachments as a secure and secret message, the user identifies the message, attachments, and the recipient(s). From the identification of the recipient, the application obtains from a message server the public key(s) for the recipient(s). The sender device may then encrypt the message using the public key(s). In certain embodiments, only encrypted messages may be made available to a recipient (as discussed further below). A message may be checked to ensure it is valid for delivery. Messages that are not encrypted, such as plain text, human readable messages may be disallowed, or alternatively a warning may be issued alerting the sender that the message is not encoded and requires further action in order to proceed. The encoded message is provided to a secure and secret message application operating on the message server, and that message application then handles the details of delivery, benign message generation, and recipient notification.

Figure 9:
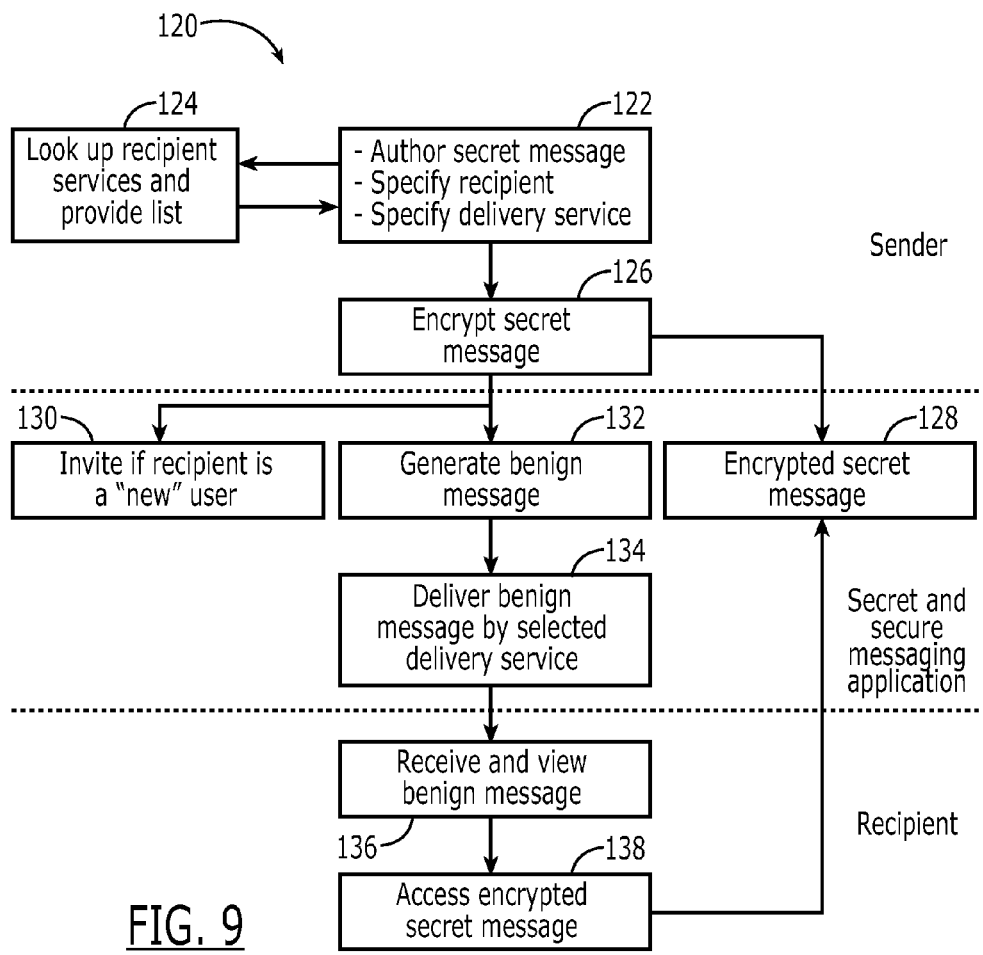
FIG. 9 is a functional flow diagram further illustrating the process for generating and sending a secure and secret message of FIG. 8 according to an embodiment of the present disclosure.
Figure 10:
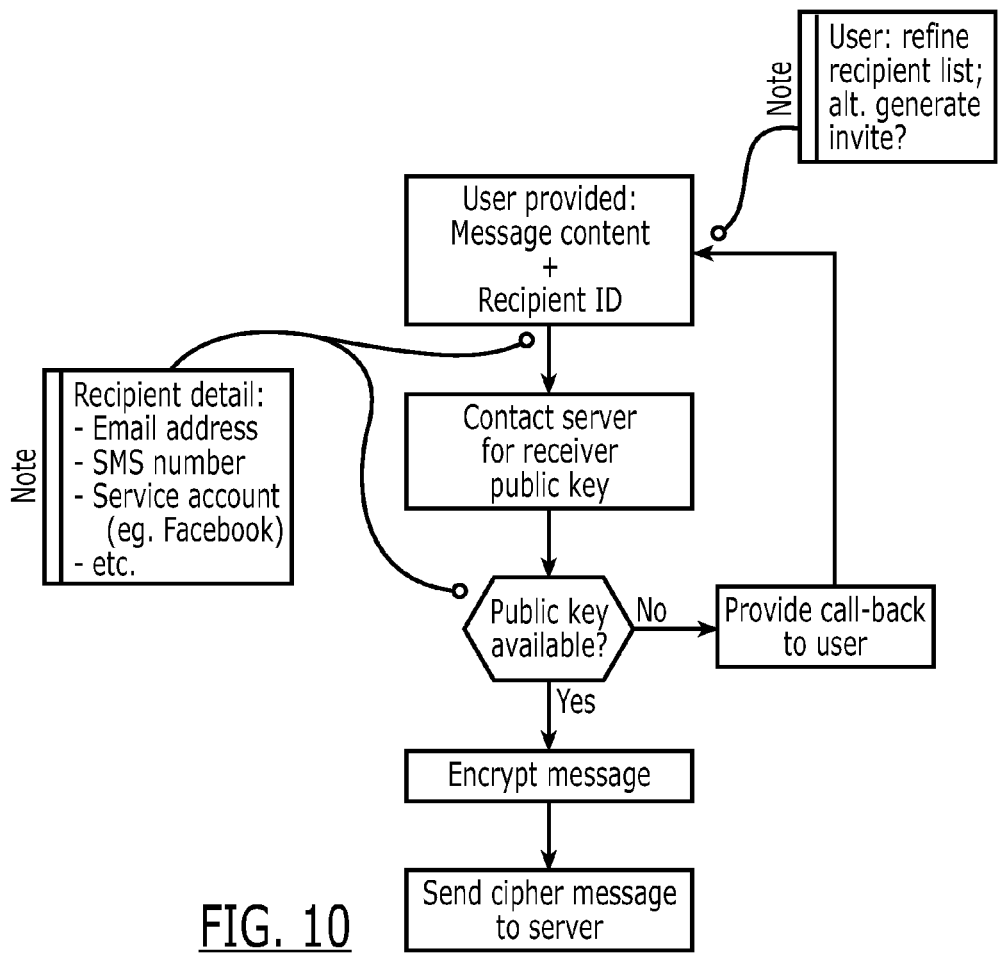
FIG. 10 is a flow chart diagram illustrating additional steps of creating an encrypted message according to an embodiment of the present disclosure.

To further illustrate the process of creating and providing a secret and secure message to a recipient, reference is now made to FIG. 9 (with additional detail illustrated in FIG. 10). Process 120 begins with the sender at 122 creating a message that the sender intends to be secret and secure and intended for the recipient, as discussed above. The sender may specify a single recipient or, in certain embodiments, multiple recipients or recipient groups may be specified. The sender also specifies the service by which a benign message is to be provided to the recipient. This specification may be explicitly, such as by selecting a "send by" radio button or pull-down option, or implicit based on the address of the recipient. Examples of services by which a benign message may be delivered include SMS messaging, email, Facebook, Twitter, LinkedIn, Google+, and so on. The benign message may, but need not necessarily be text-based. For example, the benign message may be a contextually appropriate audio clip, still or animated video clip, action or move in a game, and so on. Various different forms of contextually appropriate benign messages may imply use of different specific delivery services. Therefore, although the specific service used for delivery and format of the message are not a limitation on the scope of this disclosure. Optionally, once the recipient is identified the services available for that recipient are determined at 124, and a list of available services is provided for the sender's selection. (Which service is used, and the details for using that service for sending the message are handled by service link manager 76, FIG. 8).

The secret and secure message is then encrypted at 126 and provided to the secret and secure messaging application at 128. Any of a wide variety of known encryption methods may by employed, as will be most appropriately selected with a specific implementation of the present disclosure in mind. The specific encryption method used is not a limitation on the scope of this disclosure.

If the recipient is a "new" user to the system, an invitation and registration details are provided at 130 and registration may proceed as previously discussed.

The secure and secret messaging application then generates a benign message at 132, discussed in further detail below, and delivers that benign message to the recipient at 134 by way of the selected delivery service. The recipient receives and views the benign message at 136. The recipient may then access and view the encrypted message at 138 using the benign message as a key to the encrypted message values, discussed further below.

As previously mentioned, the user manager has access to details about registered users such as location, personal interests, family members, employment, and so on. Initially, a user as part of the registration process may enter this information. In certain embodiments, collection of such information may be automated, for example by identifying the location of the user's mobile device at the time a message is to be delivered, by examining (with the user's permission) the user's address book, calendar, or communication software (such as emails, sms, etc.) For the material examined, the user's attendance at certain events may be determined, common acquaintances may be identified, user interests may be determined, and so on. This information, whether manually entered or automatically determined, is used for the purpose of generating a benign message, under the control of message generator system 82.

For each message to be sent, at least one contextually appropriate benign message is generated. Such a message may be "How is the weather in <location> today?" where <location> is the current location of the recipient's registered device. Another example is "How are the <sports team> doing?" where <sports team> is the name of a sports team in which the recipient has an identified interest (again either by manual response or by automatic determination). While a text-based message is used for the following description, the benign message need not necessarily be text-based. (For example, the benign message may be a contextually appropriate image, audio clip, and so on.) The idea is that the recipient will receive the benign message as an indicator that the sender has a secure message for delivery to the recipient. The recipient may recognize the benign message as such an indicator by way of the name of the sender, the content of the message, an indicator associated with the message (such as an icon or text).

Figure 11:
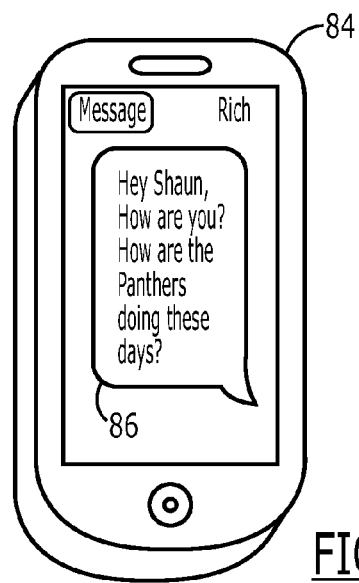
FIG. 11 is a perspective view of a mobile device illustrating a user interface for an SMS transmission of a benign message to support secret and secure communication according to an embodiment of the present disclosure.

With reference to FIG. 11, a mobile telephone (such an iOS- or Android-based device) 84 is illustrated. The telephone in this example is illustrative only, as devices other than mobile phones, such as tablets, portable computers, desktop computers, workstations, and so on may also be used. Device 84 runs a messaging application in which, for example, messages may be exchanged with other devices by SMS. The user of device 84 (Shaun) has received an SMS message 86 from a sender (Rich) that states "Hi Shaun. How are you? How are the Panthers doing these days?" This is an example of a benign message generated by a message generator (82 of FIG. 8) associated with a secret and secure messaging system server. The recipient may know that Rich periodically communicates via a secret and secure messaging system of a type disclosed herein, and therefore be alert to messages that may suggest the sender has also posted a secret and secure message at the secret and secure messaging application server.

Figure 12A:
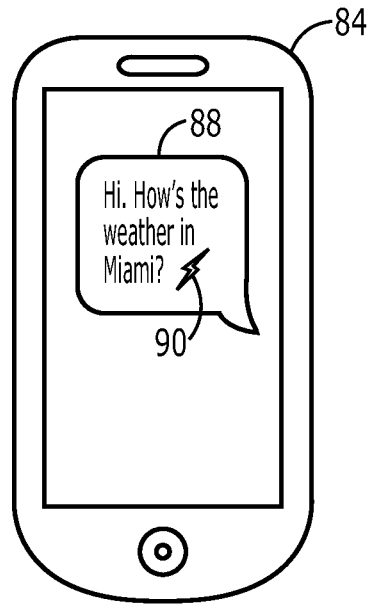
FIGS. 12A-12D are perspective views of a mobile device illustrating alternative user interfaces for alerting a user through an SMS transmission of a benign message of the existence of a secret and secure communication according to an embodiment of the present disclosure.
Figure 12B:
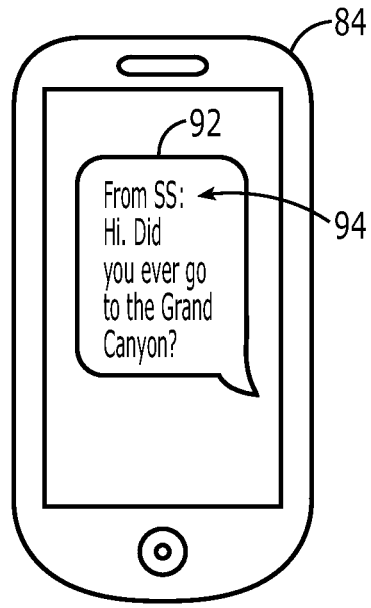
Figure 12C:
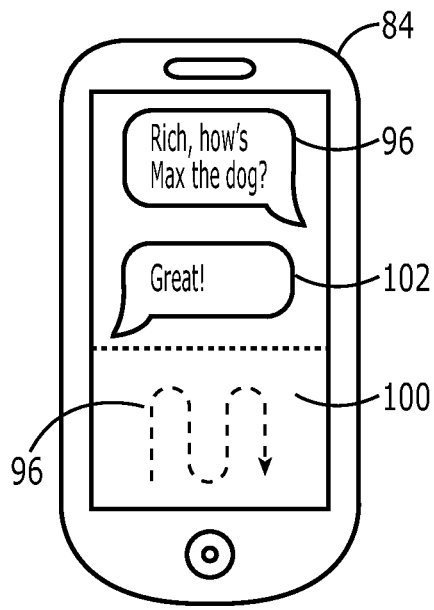
Figure 12D:
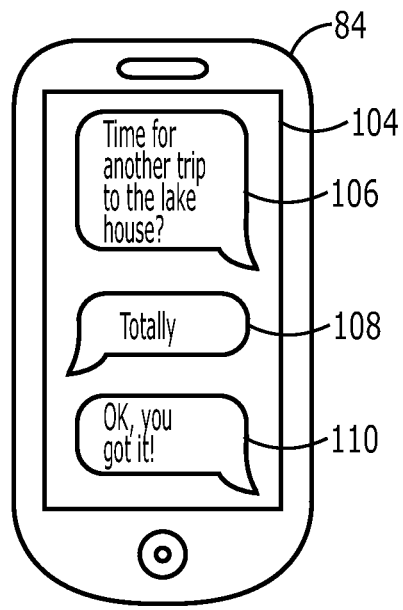

In addition to the content of message 86, other flags may be present to suggest to the user of device 84 that a secret and secure message may be waiting. For example, with reference to FIG. 12A, an SMS message 88 may include a special icon 90, that a user would recognize as a clue that a secret message is associated with the benign message. With reference to FIG. 12B, an SMS message 92 may have benign prefix data 94 associated with it, such as "From SS:" or the like preceding content. With reference to FIG. 12C, the messaging system on device 84 includes code that permits the user to test a message to determine if is associated with a secret and secure message. For example, upon receipt of message 96, the user may perform some touch-based gesture 98 on a designated portion 100 of the screen of device 84. If the proper touch-based gesture 98 is provided, an additional benign message 102 may be generated, in context with message 96, confirming to the user is near real-time that a secret and secure message is available. With reference to FIG. 12D, an example of an exchange of benign messages is shown that may confirm that a secret and secure message is available. A recipient receives a first message 106, and provides a contextually appropriate message 108. The secret and secure messaging system interprets reply 108, and provides a confirming benign message 110 indicating to the recipient that indeed a secret and secure message is available. Of course there are merely several examples of the general idea that a recipient may be provided with an indicia that, from a benign message, a secret and secure message is available. Furthermore, while the examples above use text-based (SMS) messaging, other forms of messaging may also be used, such as email, posting to a social web service (e.g., Facebook, LinkedIn, etc.), micro-blog posting (e.g., Twitter), inter-application messaging (e.g., messaging within and specific to a computer-based game, accounting software, etc.), and even machine-generated voice mail.

Figure 13A:
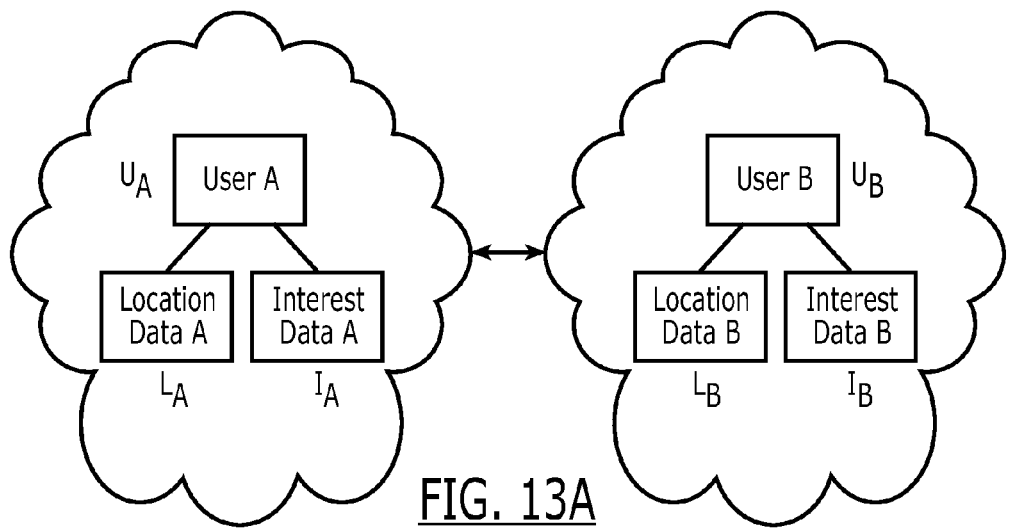
FIGS. 13A and 13B illustrate an exemplary process for generating a benign message according to an embodiment of the present disclosure.
Figure 13B:
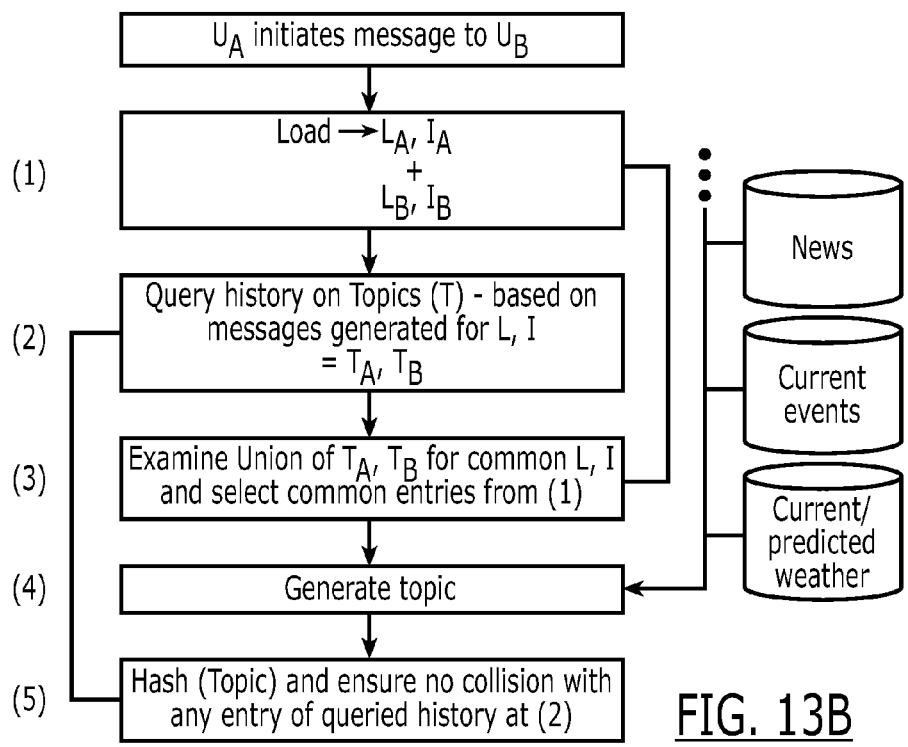

Furthermore, the native language, idiom or regionalism of the benign message may vary from that of the secret and secure message, and be selected to be contextually appropriate. Optionally, a check system may be introduced to ensure that the same benign message is not used twice or too close in time. A computer-based natural language interpreter may also be employed by the message server (or in association therewith) to ensure that two or more benign, contextually appropriate messages are sensible and plausible, and such that a third party would not likely be alerted that the benign messages are computer generated. These benign messages are guaranteed unique among the communicating parties (sender/receivers pair) such that the parties never duplicate previous messages but may send messages that contain non-unique subjects (i.e. weather, sports, local events.). An exemplary process for generating a benign message is illustrated in FIGS. 13A and 13B. Still further, the benign message may also be password protected, such as using a "safe key" (discussed further below), for an appearance of security, to be consistent with the system in which the messaging takes place, and so on.

There are numerous benefits to automated generation of a benign message. First, if the recipient's device is lost or becomes accessible to a third party, only the benign messages are visible and retained in the device. As will be described following, the benign message is the key to the encrypted message value. Viewing of the encrypted message occurs in a transient secure session, and no copy of the message is retained on the viewing device with the session is ended. Second, the benign message provides plausible deniability to the existence of the encrypted message. That is, the user has a reasonable basis for arguing that no encrypted message was ever received. Indeed, with no encrypted message delivered to the recipient device, there is no message present that a third party might try to decrypt. Finally, since the benign message is machine generated, the sender is not troubled by needing to generate a benign message, and in fact user privacy may be provided in that the sender need not know anything about the personal user details associated with the recipient.

Figure 14:
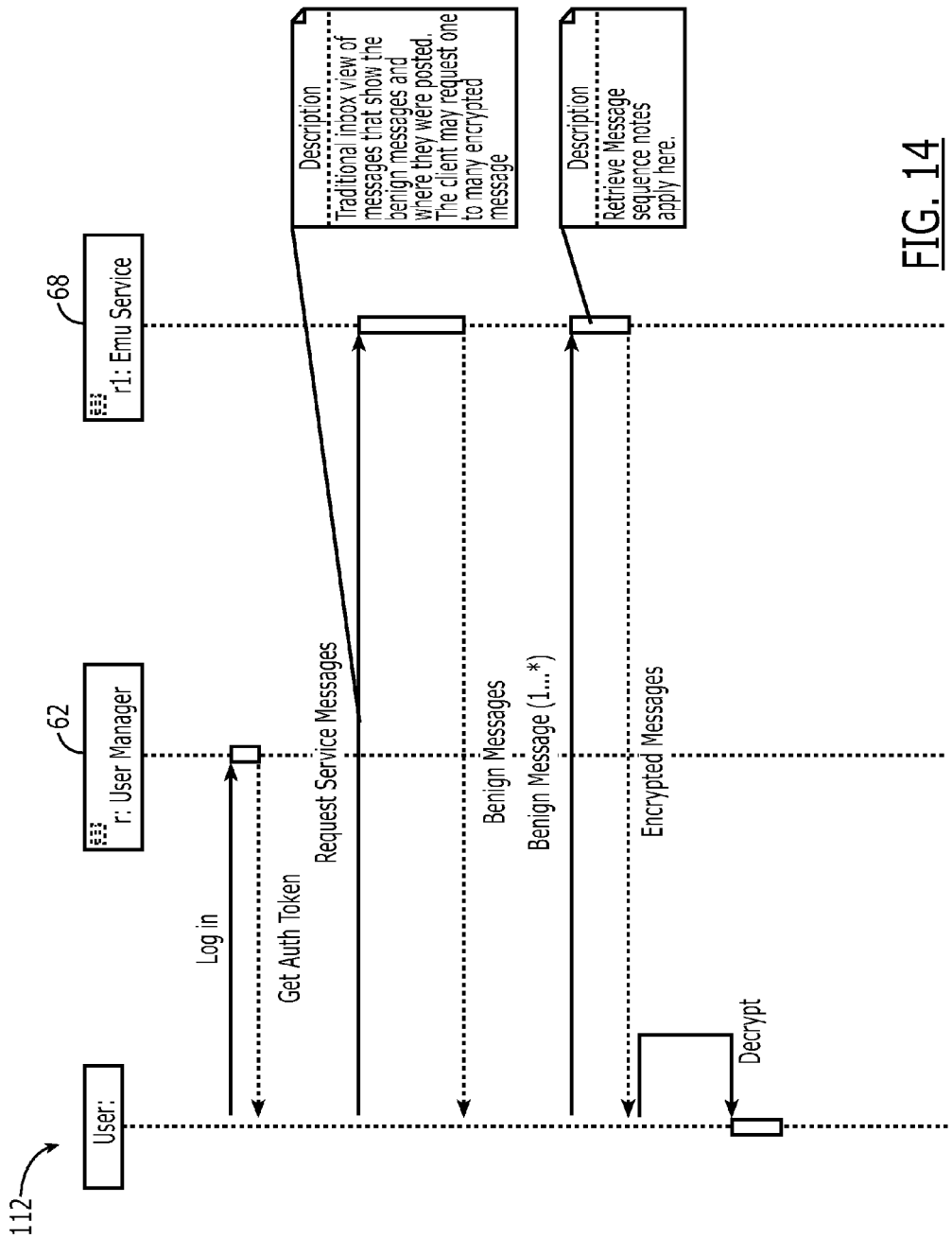
FIG. 14 is a communications flow diagram illustrating an example of the process of retrieval of a secret and secure communication from a traditional "in-box" view of such messages according to an embodiment of the present disclosure.

With reference next to FIG. 14, receipt of benign message 86, and the resulting realization that a secret and secure message may be waiting for the recipient at the secret and secure messaging application server, may suggest one or more actions by the recipient. The user may launch an application, either on a computer (such as a personal computer, workstation or the like) or on a portable device such as a tablet or smart-phone, that communicates with the secret and secure messaging application server. This communication will be a secure communication session, such as by way of Transport Layer Security (TSL) or Secure Sockets Layer (SSL) protocols for encrypted communication over the Internet (e.g., HTTPS).

Once launched, the application provides a recipient with choices for how to view the secret and secure message. The recipient may request to view in an "in-box" style viewer. According to process 112, the in-box will shown or contain the benign message, the sender of the message, and the mode of delivery of the benign message (e.g., SMS number, email address, Facebook account, etc.) The benign message is an index to the secret and secure message, so that by selecting the benign message the recipient can retrieve and view the secret and secure message.

In certain embodiments, a user may view the secret and secure message by way of the application, but no content is downloaded to the recipient's device. In other embodiments, the benign message is first received on a first device, and the application communicating with the secret and secure messaging application server runs on a second machine such that any secret and secure messages are downloaded to the second device and not to the first device. In this way, the first device remains free of traces of the secret and secure message.

Figure 15:
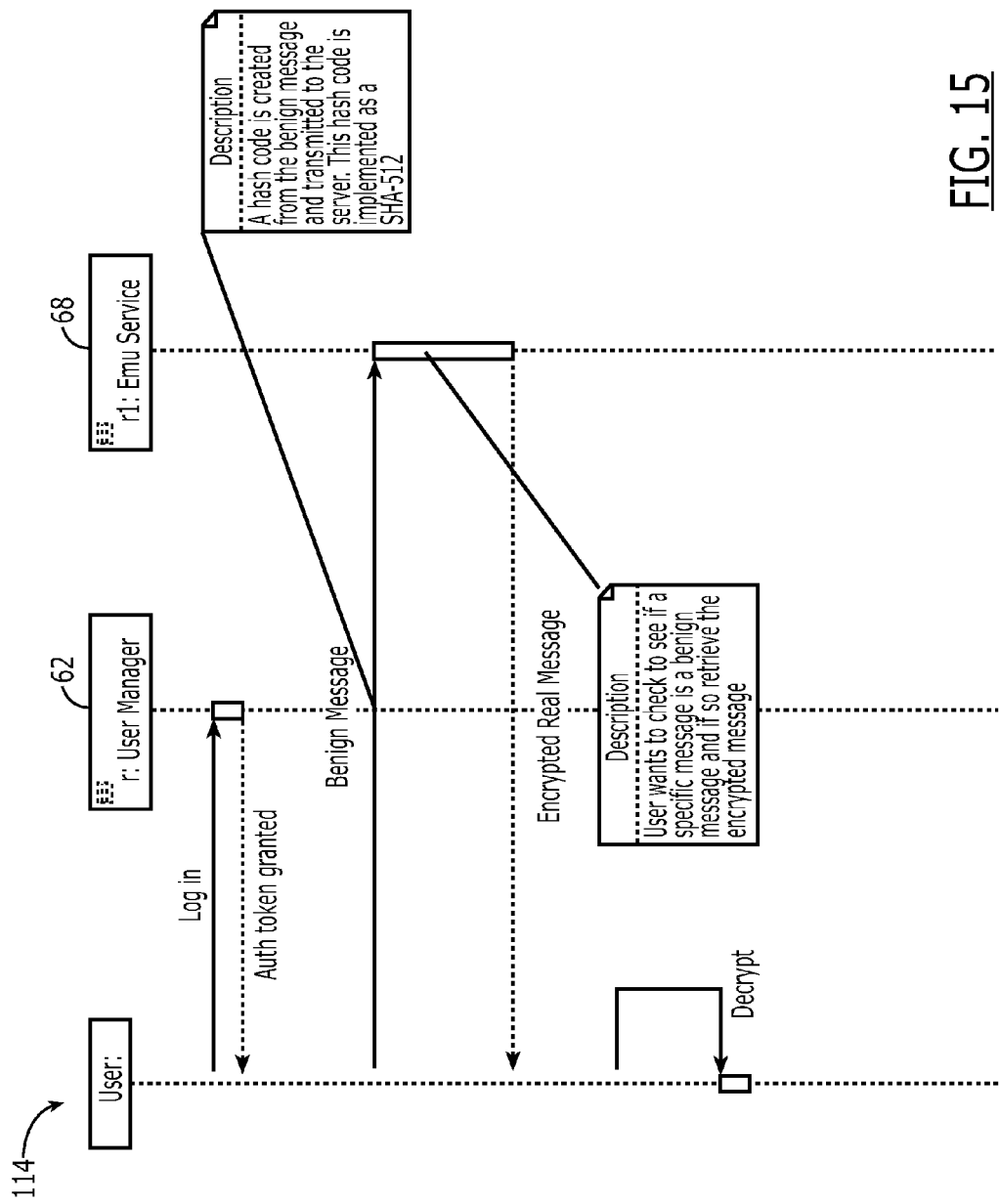
FIG. 15 is a communications flow diagram illustrating an example of the process of retrieval of a secret and secure communication on a message-by-message basis according to an embodiment of the present disclosure.

In still further embodiments, the recipient may request one or more messages be downloaded to recipient's device for viewing and further action. With reference to FIG. 15, according to process 114, the recipient may use the device on which the benign message was received, and a secret and secure messaging application running thereon, to log in to the secret and secure messaging application server. Once logged in, the user selects a received benign message and the application generates a hash code from the message. That code is used to transmit the message securely to the authorized recipient device.

Multiple passwords may be provided and used in the access and decryption steps. A Main Password may be provided that provides access to the encrypted message and authorizes its decryption. A Safe Password may also be provided that provides a plausible deniability function. When the Safe Password is entered the message server may return a unique, alternate benign, contextually appropriate message, for example a machine-generated dialog message. This is useful, for example, when a user is forced to divulge a password under duress. Entering the Safe Password produces a plausible message, but one different from the secret and secure message. Of course, and invalid password will produce an error message or no message at all.

Figure 16:
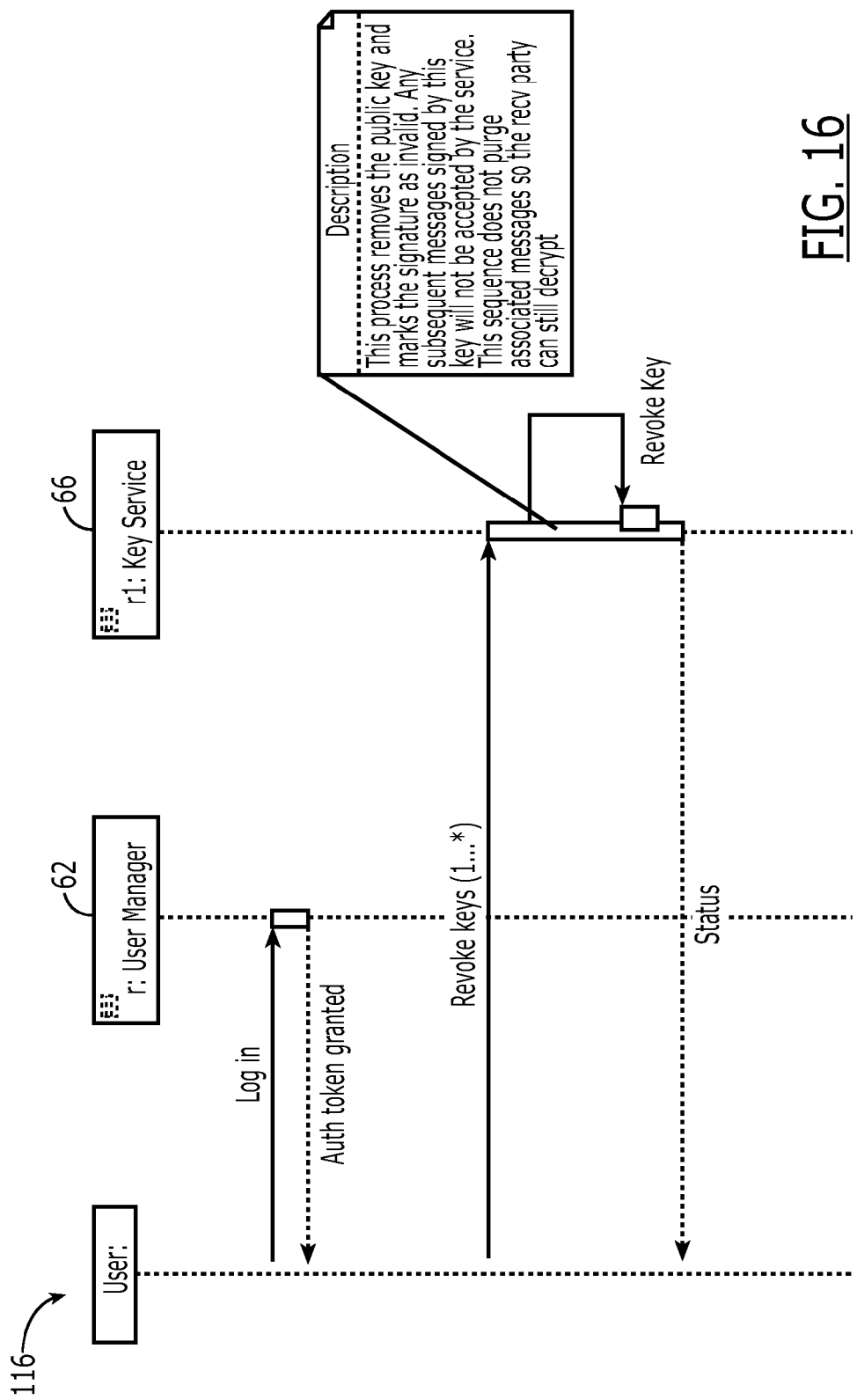
FIG. 16 is a communications flow diagram illustrating an example of a process for revoking keys in a system for secret and secure communication according to an embodiment of the present disclosure.

As mentioned, in certain circumstances a user may wish to request that keys to a specific service be revoked. The user, for example, may wish to revoke all past, current, and future communication on a microblogging site but keep past/current/future communication on that user's associated email/sms service. (Reasons behind this could be a general distrust of a service, preference to no longer communicate via this service, creating a new account and deprecating a previous account on a service, etc.) Another reason to do so is to prevent any decryption of previous messages or encryption of new messages associated with the user. That is, it is one way to permanently prevent anyone from accessing encrypted messages. Process 116 illustrated in FIG. 16 demonstrates one example of revocation of a specific key. It will be appreciated that in process 116 the public key is removed, rendering the signature invalid for future messages. However, the messages are not purged, so they remain accessible for decryption by the receiving party.

Figure 17:
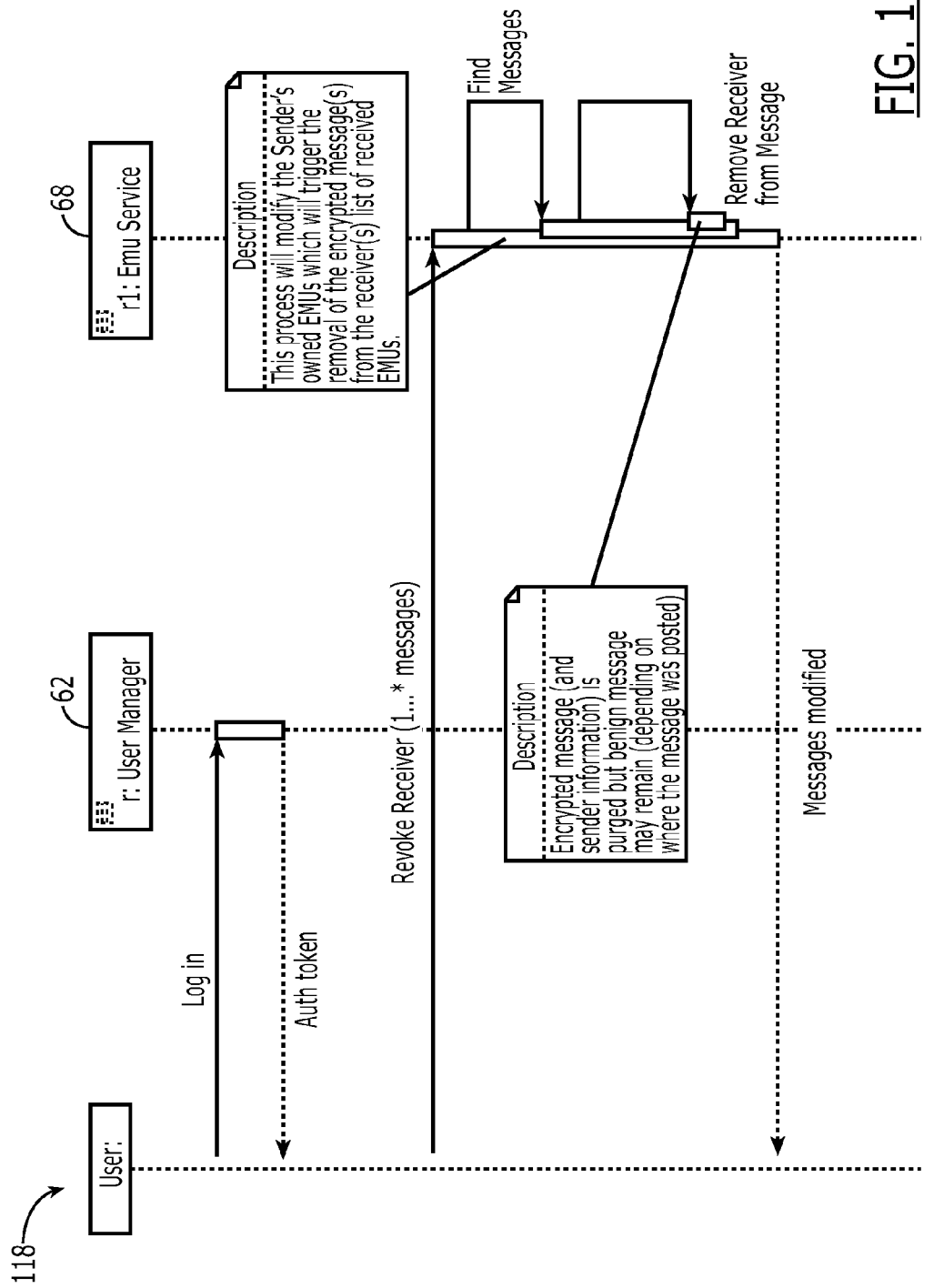
FIG. 17 is a communications flow diagram illustrating an example of a process for revoking a message recipient in a system for secret and secure communication according to an embodiment of the present disclosure.

According to a variation of the above process, a recipient's access to a message may be completely removed. Process 118 illustrated in FIG. 17 shows one example. According to this process, when a sender modifies his/her own message that message is removed from the recipient's list of received messages. The sender will continue to have access to the message, but the recipient will have no record of the encrypted message. The benign message may remain on the recipient's device, subject to the measures the recipient takes to remove it and where it was posted.

Figure 18:
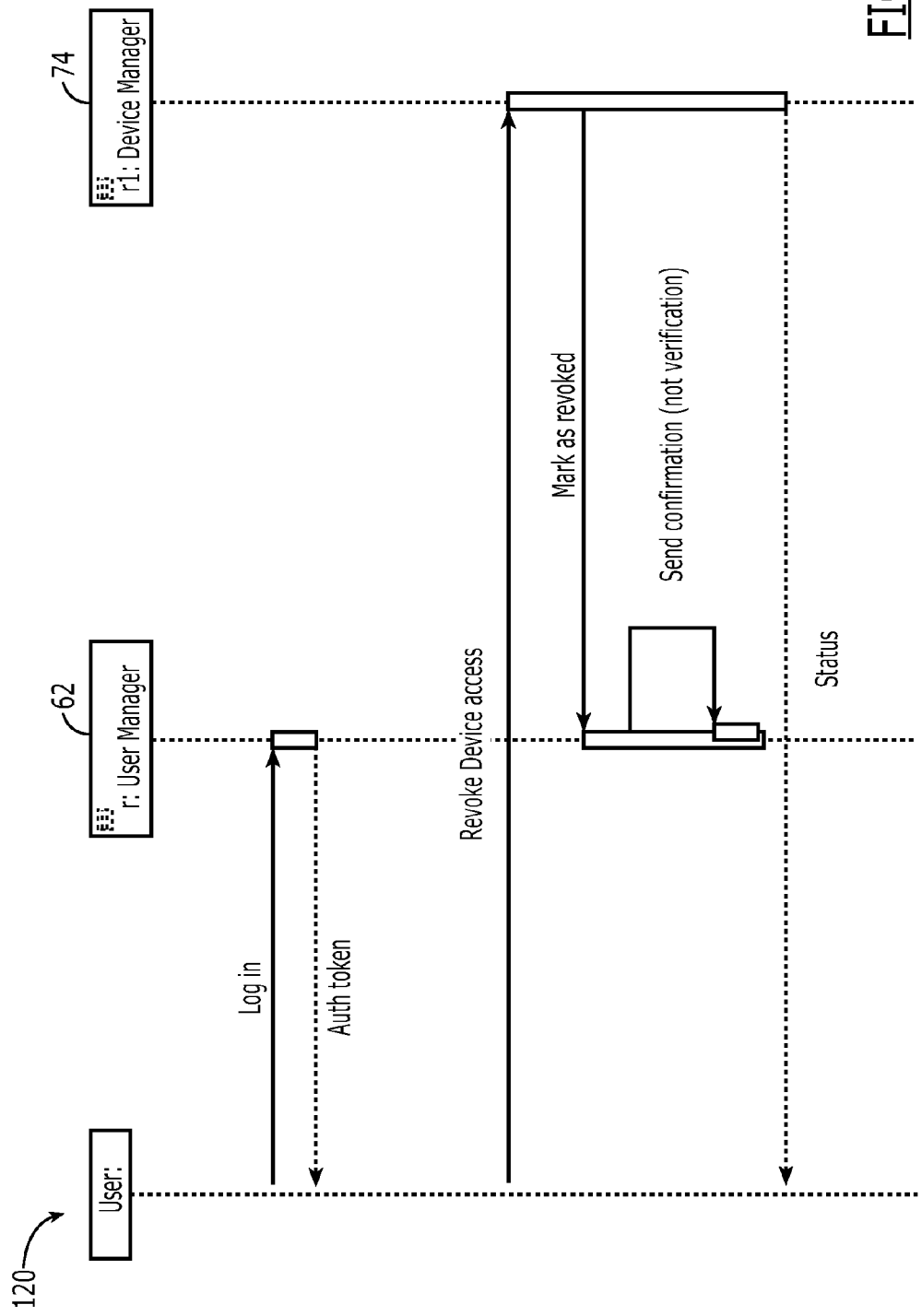
FIG. 18 is a communications flow diagram illustrating an example of a process for revoking a device in a system for secret and secure communication according to an embodiment of the present disclosure.

Still further, process 120 illustrated in FIG. 18 fully revokes the authority of a recipient device. This process will revoke the access a device has to the secret and secure messaging application server, thus preventing any access to secret and secure messages. Again, benign messages may remain accessible on the device having revoked authority. This process is useful if, for example, a device is lost, replaced, or otherwise not trusted.

Figure 19:
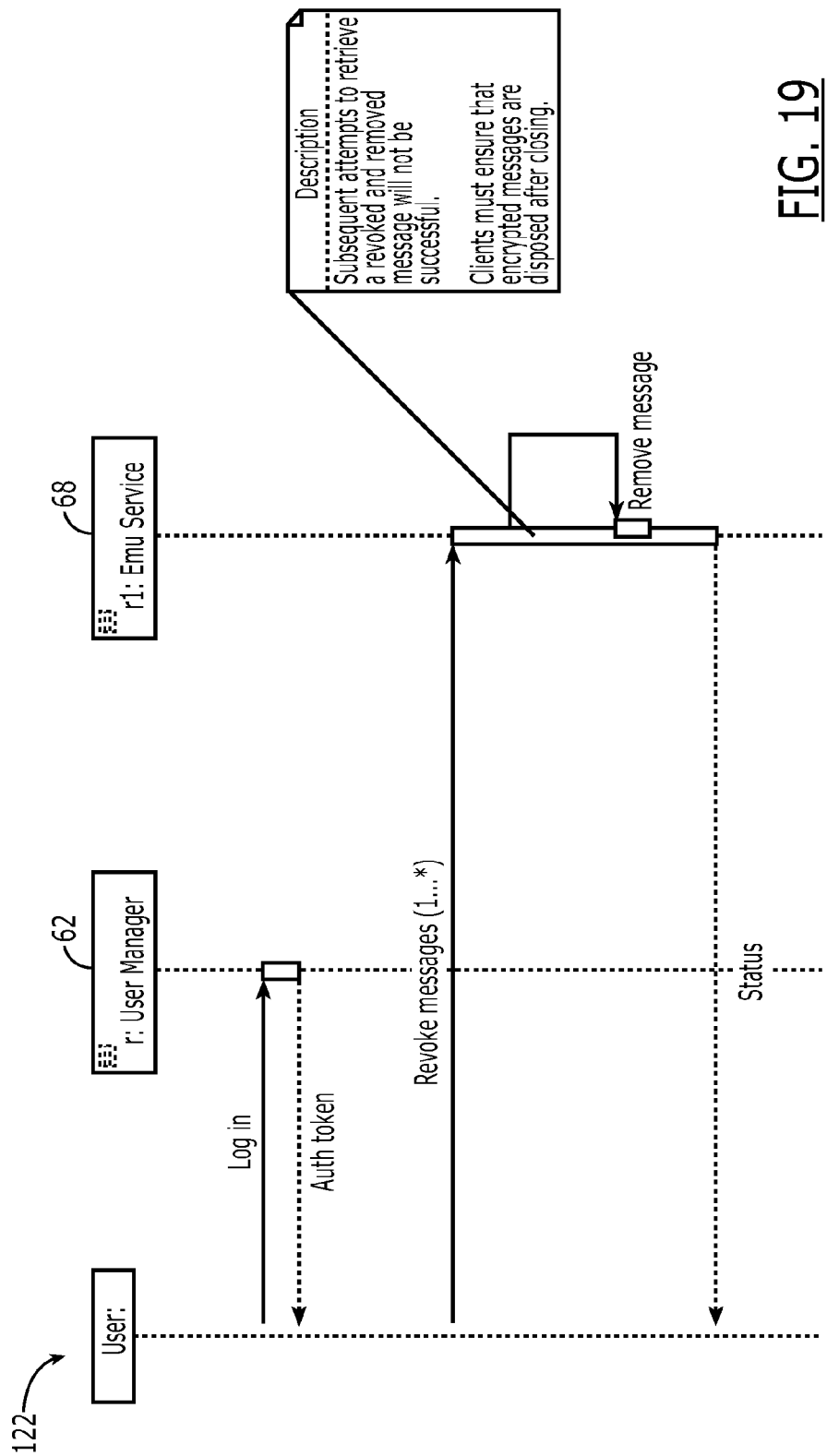
FIG. 19 is a communications flow diagram illustrating an example of a process for terminating access to a message in a system for secret and secure communication according to an embodiment of the present disclosure.

Finally, with reference to FIG. 19, a process 120 is illustrated for removal of a message from the secret and secure messaging application server. This process purges an encrypted message from the secret and secure messaging application server itself. If the encrypted message has been downloaded to the recipient device, steps should also be taken to purge that message from the recipient device for security. Known automated process for such removal are one recommended method of ensuring secrecy and security of downloaded messages. Alternatively, the process may provide steps for automatic purging of the message from both the sending device and the receiving device. Furthermore, the benign message may remain on either or both the sending and receiving devices if desired, for example for plausible deniability.

In the description above, a message has been encrypted, provided to a server, and its presence advertised to a desired recipient by way of a benign message. The message may be in virtually any file format, including SMS, text or word processor formats (e.g., .doc, .txt, .pdf, .odt), mail formats (e.g., .msg), image formats (e.g., JPEG, GIF, TIFF, BMP), video formats (e.g., .flv, .mov, .mp4, .mpg), audio formats (e.g., .mid, .mp3, .wav), data formats (e.g., .dat, .csv, .efx), executable file formats (e.g., .app, .exe), and so on. Furthermore, a message in any of these formats may include attachments that may themselves be in any desired format. The attachments may be separately encrypted and associated with a message or may be encrypted as part of the message itself.

According to certain embodiments of the disclosure, the sender may indicate a lifespan for the message. The lifespan may be measured in a variety of ways, such as elapsed time, an absolute date, a number of views, a number of attempted decryptions, etc. After passing of the lifespan, access to the message may be revoked, for example as illustrated and discussed with reference to FIGS. 16-18, by revoking keys, devices, hashing, and so on.

Figure 20:
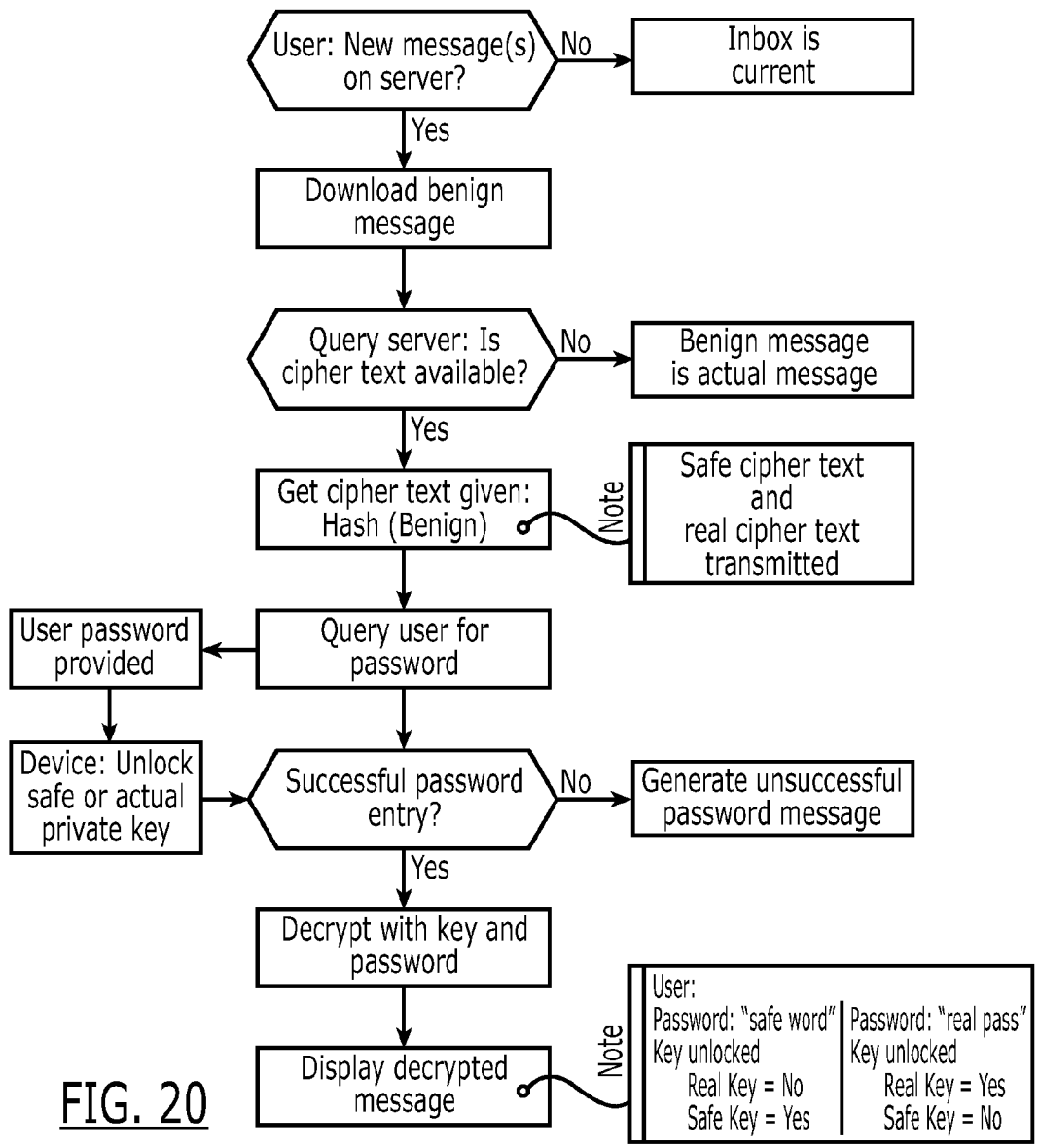
FIG. 20 is a flow chart diagram illustrating the steps of determining whether to provide a secret, encrypted message and the steps for decrypting that message, according to an embodiment of the present disclosure.

With reference to FIG. 20, a method for decrypting a secret message according to another embodiment of the present disclosure is illustrated. According to this embodiment, each user has at least two keys created as part of the account creation: The primary key pair, for passing a secret message and exchanging with trusted contacts; and a compelled-to-produce ("safe") key pair, used when someone forces a user to give up a password. If a user is forced to give up a key, the user can provide the safe key that will provide access only an otherwise benign or false message or set of messages either generated by the system or pre-defined by the user. In the case of the safe key, only the central-server has access to this public key.

According to the present disclosure, a user interacts with a computer system and controls provided thereby to generate and deliver a secret and secure message. In the process, the user's system may communicate with other systems to obtain data, verify data, deliver data, store or retrieve data, etc. Those other systems may be interfaces to other computer-user interactions or be autonomous or some combination of the two. As used herein, "interface" is intended to include data structures, virtual and physical connections between devices, computer-human user interface, and other mechanisms that facilitate the exchange of data between computer system and/or control of one or more such systems.

The embodiments described, and hence the scope of the claims below, encompass embodiments in hardware, software, firmware, or a combination thereof. It will also be appreciated that the methods, in the form of instructions having a sequence, syntax, and content, of the present disclosure may be stored on (or equivalently, in) any of a wide variety of computer-readable storage media such as magnetic media, optical media, magneto-optical media, electronic media (e.g., solid state ROM or RAM), etc., the form of which media not limiting the scope of the present disclosure. A computer reading said media is operable to either transfer (e.g., download) said instructions thereto and then operate on those instructions, or cause said instructions to be read from the media and operate in response thereto. Furthermore, devices (e.g., a reader) for accessing the instructions on said media may be contained within or connected directly to the computer on which those instructions operate, or may be connected via a network or other communication pathway to said computer.

No limitation in the description of the present disclosure or its claims can or should be read as absolute. The limitations of the claims are intended to define the boundaries of the present disclosure, up to and including those limitations. To further highlight this, the term "substantially" may occasionally be used herein in association with a claim limitation (although consideration for variations and imperfections is not restricted to only those limitations used with that term). While as difficult to precisely define as the limitations of the present disclosure themselves, we intend that this term be interpreted as "to a large extent", "as nearly as practicable", "within technical limitations", and the like.

Furthermore, while a plurality of preferred exemplary embodiments have been presented in the foregoing detailed description, it should be understood that a vast number of variations exist, and these preferred exemplary embodiments are merely representative examples, and are not intended to limit the scope, applicability or configuration of the disclosure in any way. Various of the above-disclosed and other features and functions, or alternative thereof, may be desirably combined into many other different systems or applications. Various presently unforeseen or unanticipated alternatives, modifications variations, or improvements therein or thereon may be subsequently made by those skilled in the art which are also intended to be encompassed by the claims, below.

Therefore, the foregoing description provides those of ordinary skill in the art with a convenient guide for implementation of the disclosure, and contemplates that various changes in the functions and arrangements of the described embodiments may be made without departing from the spirit and scope of the disclosure defined by the claims thereto.

What is claimed is:

1. A system providing secret and secure electronic messaging delivery, comprising:
   a message device comprising a recipient address key table and a recipient address context data table;
   a receiving device communicatively coupled to said message device;
   a sending device communicatively coupled to said message device, said sending device comprising:
   a message application configured to:
   enable selection of a message;
   enable specifying a recipient address for said message; and
   retrieve from said recipient address key table an encryption key corresponding to said recipient address;
   an encryption engine configured to encrypt said message using said encryption key associated with said recipient address; and
   an interface to deliver said encrypted message associated with said recipient address to said message device;
   said message device configured to:
   use said recipient address specified by said messaging application and context data from said recipient address context data table associated with said recipient address to generate a benign, contextually appropriate message, said benign, contextually appropriate message devoid of explicit reference to said encrypted message, but said benign, contextually appropriate message serving as an indicator of the availability of said encrypted message;
   post said encrypted message to a messaging portion of said message device;
   initiate delivery of said benign, contextually appropriate message to said recipient address as an indicator of the availability of said encrypted message;
   said receiving device configured to:
   receive said benign, contextually appropriate message and determine whether said benign, contextually appropriate message indicates said encrypted message is available for retrieval from said message device; and
   responsive to determining that said encrypted message is available for retrieval from said message device, retrieve said encrypted message from said message device;
   wherein said message device is configured such that said encrypted message is accessible on said message device only during a predefined lifespan of said encrypted message.

2. The system of claim 1, further comprising:
   said message device configured to determine if said recipient address is a registered address, and if it is not a registered address, said messaging device creates an invitation message and initiates delivery of said invitation message to recipient address; and
   said messaging server configured to initiate delivery of said benign, contextually appropriate message to said recipient address only after said recipient address becomes a registered address.

3. The system of claim 1, wherein said benign, contextually appropriate message includes a link value linking said benign, contextually appropriate message to said encrypted message such that a user action associated with said benign, contextually appropriate message causes said message device to initiate access to said encrypted message.

4. The system of claim 3, wherein said user action associated with said benign, contextually appropriate message causes said message device to initiate a password challenge.

5. The system of claim 1, wherein access to said benign, contextually appropriate message requires entry of a first password, and access to said encrypted message requires entry of a second password that is different then said first password.

6. The system of claim 5, wherein a device receiving said benign, contextually appropriate message is configured to authenticate said first password, and said message device is configured to authenticate said second password.

7. The system of claim 6, wherein said message device is configured to receive a third password and in response thereto initiate delivery of an alternate benign, contextually appropriate message to the device issuing said third password.

8. The system of claim 1, wherein said message application is configured to deliver said benign, contextually appropriate message to a recipient device by way of a third party messaging application.

9. The system of claim 8, wherein said message application is further configured to enable a user to select said third party messaging application by which said benign, contextually appropriate message is to be delivered to said recipient device.

10. The system of claim 1, further comprising a recipient device comprising a recipient message application operating on a recipient device and configured to receive a request to retrieve said encrypted message, to communicate with said message device to authenticate said request to retrieve said encrypted message, and if said request is authenticated, to initiate retrieving and decrypting said encrypted message.

11. The system of claim 1, wherein said lifespan is defined by at least one measure selected from the group consisting of: elapsed time, an absolute date, a number of views of said encrypted message, a number of unsuccessful attempted decryptions, and a number of successful attempted decryptions.

12. The system of claim 1, wherein said message device is configured to use at least one seed to generate said benign, contextually appropriate message, said seed selected from the group consisting of: a physical location of said recipient; a communication from or to said recipient; and a personal profile of said recipient.

13. The system of claim 1, wherein said message application is further configured to encrypt a supplemental document with said message, and bundle together said encrypted message, said encrypted supplemental document for posting to said messaging portion of said message device.

14. The system of claim 1, wherein said message device comprises a message server physically separate from said sending device.

15. A method for providing secret and secure electronic messaging delivery, comprising:
configuring a message device to comprise a recipient address key table and a recipient address context data table;
configuring a receiving device communicatively coupled to said message device;
configuring a sending device communicatively coupled to said message device to comprise:
a message application configured to:
enable selection of a message;
enable specifying a recipient address for said message; and
retrieve from said recipient address key table an encryption key corresponding to said recipient address;
configuring an encryption engine to encrypt said message using said encryption key associated with said recipient address; and
delivering said encrypted message associated with said recipient address to said message device;
further configuring said message device to:
use said recipient address specified by said messaging application and context data from said recipient address context data table associated with said recipient address to generate a benign, contextually appropriate message, said benign, contextually appropriate message devoid of explicit reference to said encrypted message, but said benign, contextually appropriate message serving as an indicator of the availability of said encrypted message;
post said encrypted message to a messaging portion of said message device;
initiate delivery of said benign, contextually appropriate message to said recipient address as an indicator of the availability of said encrypted message;
further configuring said receiving device to:
receive said benign, contextually appropriate message and determine whether said benign, contextually appropriate message indicates said encrypted message is available for retrieval from said message device; and
responsive to determining that said encrypted message is available for retrieval from said message device, retrieve said encrypted message from said message device;
wherein said message device is further configured such that said encrypted message is accessible on said message device only during a predefined lifespan of said encrypted message.

16. The method of claim 15, further comprising:
configuring said message device to determine if said recipient address is a registered address, and if it is not a registered address, said messaging server creates an invitation message and initiates delivery of said invitation message to recipient address; and
configuring said messaging server to initiate delivery of said benign, contextually appropriate message to said recipient address only after said recipient address becomes a registered address.

17. The method of claim 15, further comprising configuring said message application to deliver said benign, contextually appropriate message to a recipient device by way of a third party messaging application.

18. The method of claim 17, further comprising configuring said message application to enable a user to select said third party messaging application by which said benign, contextually appropriate message is to be delivered to said recipient device.

19. The method of claim 15, further comprising defining said lifespan by at least one measure selected from the group consisting of: elapsed time, an absolute date, a number of views of said encrypted message, a number of unsuccessful attempted decryptions, and a number of successful attempted decryptions.

20. The method of claim 15, further comprising configuring said message device to use at least one seed to generate said benign, contextually appropriate message, said seed selected from the group consisting of: a physical location of said recipient; a communication from or to said recipient; and a personal profile of said recipient.

21. The method of claim 15, further comprising configuring said message application to encrypt a supplemental document with said message, and bundle together said encrypted message, said encrypted supplemental document for posting to said messaging portion of said message device.

22. A method for providing secret and secure electronic messaging delivery, comprising:
creating a target message on a first computer-based system, and designating a recipient address for said target message;
said first computer-based system retrieving from a second computer-based system an encryption key associated with said designated recipient address;
said first computer-based system encrypting said target message and providing said encrypted target message to said second computer-based system together with said recipient address;
said second computer-based system using said designated recipient address and user data associated with said designated recipient address to generate a benign, contextually appropriate message, said benign, contextually appropriate message devoid of explicit reference to said encrypted message, but said benign, contextually appropriate message serving as an indicator of the availability of said encrypted message, and initiate delivery of said benign, contextually appropriate message to said designated recipient address to thereby provide an indicator of the availability of said encrypted target message on said second computer-based system; and a third computer-based system associated with said designated recipient address receiving said benign, contextually appropriate message and determining whether said benign, contextually appropriate message indicates said encrypted message is available for retrieval from said message device; and responsive to determining that said encrypted message is available for retrieval from said message device, retrieving said encrypted message from said message device;

wherein said second computer-based system is configured such that said encrypted message is accessible on said second computer-based system only during a predefined lifespan of said encrypted message.

23. The method of claim 22, further comprising assigning at least two passwords to a user such that a first password may be used to authorize retrieval from said second computer-based system and decryption of said encrypted target message, and a second password may be used to retrieve an alternate benign, contextually appropriate message from said second computer-based system.

* * * * *